United States Patent
Kim et al.

(10) Patent No.: US 9,985,756 B2
(45) Date of Patent: May 29, 2018

(54) MULTICARRIER-BASED DATA TRANSMISSION METHOD AND APPARATUS IN MOBILE COMMUNICATION SYSTEM

(71) Applicant: Samsung Electronics Co., Ltd., Suwon-si, Gyeonggi-do (KR)

(72) Inventors: Soenghun Kim, Suwon-si (KR); Gert-Jan Van Lieshout, Apeldoorn (NL); Youngbum Kim, Seoul (KR); Aris Papasakellariou, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 14/608,589

(22) Filed: Jan. 29, 2015

(65) Prior Publication Data

US 2015/0215944 A1 Jul. 30, 2015

(30) Foreign Application Priority Data

Jan. 29, 2014 (KR) .................. 10-2014-0011266
Apr. 1, 2014 (KR) .................. 10-2014-0038833
Oct. 2, 2014 (KR) .................. 10-2014-0133366
Oct. 22, 2014 (KR) .................. 10-2014-0143643
Nov. 17, 2014 (KR) .................. 10-2014-0160369

(51) Int. Cl.
*H04W 72/04* (2009.01)
*H04L 5/00* (2006.01)
(Continued)

(52) U.S. Cl.
CPC ............ *H04L 5/001* (2013.01); *H04L 5/0098* (2013.01); *H04W 24/08* (2013.01); *H04W 48/16* (2013.01); *H04W 72/0426* (2013.01)

(58) Field of Classification Search
CPC . H04W 24/08; H04W 48/16; H04W 72/0426; H04W 24/00; H04L 5/001; H04L 5/0098; H04L 43/50
(Continued)

(56) References Cited

U.S. PATENT DOCUMENTS

2009/0300456 A1* 12/2009 Pelletier ................ H04L 1/1812
714/749
2010/0202382 A1* 8/2010 Park ...................... H04L 5/0053
370/329
(Continued)

FOREIGN PATENT DOCUMENTS

EP 2582170 A1 4/2013
KR 10-2001-0112789 A 10/2011
(Continued)

*Primary Examiner* — Zhiren Qin
(74) *Attorney, Agent, or Firm* — Jefferson IP Law, LLP

(57) ABSTRACT

A multicarrier-based data transmission method and an apparatus for use in a mobile communication system are provided. A Radio Network Temporary Identity (RNTI) reception method of a terminal in a wireless communication system supporting inter-evolved Node B (eNB) carrier aggregation includes receiving cell information on at least one activated cell under control of an eNB, configuring first and second RNTIs allocated by the eNB, monitoring the at least one activated cell for the first RNTI, and monitoring a primary cell among the at least one activated cell for the second RNTI.

10 Claims, 19 Drawing Sheets

(51) Int. Cl.
*H04W 24/08* (2009.01)
*H04W 48/16* (2009.01)

(58) Field of Classification Search
USPC .......................................................... 370/329
See application file for complete search history.

(56) References Cited

U.S. PATENT DOCUMENTS

| | | | |
|---|---|---|---|
| 2011/0038342 A1 | 2/2011 | Lindskog et al. | |
| 2012/0127913 A1* | 5/2012 | Lin ...................... | H04W 68/00 370/312 |
| 2012/0140638 A1 | 6/2012 | Zhao et al. | |
| 2012/0281576 A1* | 11/2012 | Yamada ................ | H04L 1/0046 370/252 |
| 2013/0058240 A1 | 3/2013 | Kim et al. | |
| 2013/0258862 A1 | 10/2013 | Dinan | |
| 2013/0329652 A1* | 12/2013 | Pani .................... | H04W 72/121 370/329 |
| 2014/0286305 A1* | 9/2014 | Yamada .............. | H04W 36/165 370/331 |
| 2014/0355539 A1 | 12/2014 | Yang et al. | |
| 2015/0173120 A1* | 6/2015 | Yamada ............ | H04W 36/0072 370/331 |
| 2015/0341865 A1* | 11/2015 | Yang ................... | H04W 52/146 455/522 |
| 2016/0043849 A1* | 2/2016 | Lee ....................... | H04L 5/0053 370/329 |
| 2016/0192254 A1* | 6/2016 | Hooli ................ | H04W 36/0055 370/331 |

FOREIGN PATENT DOCUMENTS

| | | |
|---|---|---|
| KR | 10-2012-0025527 A | 3/2012 |
| WO | 2013/095004 A1 | 6/2013 |

* cited by examiner

MULTICARRIER-BASED DATA TRANSMISSION METHOD AND APPARATUS IN MOBILE COMMUNICATION SYSTEM

CROSS-REFERENCE TO RELATED APPLICATION(S)

This application claims the benefit under 35 U.S.C. § 119(a) of Korean patent applications filed on Jan. 29, 2014, Apr. 1, 2014, Oct. 2, 2014, Oct. 22, 2014, and Nov. 17, 2014 in the Korean Intellectual Property Office and assigned Serial numbers 10-2014-0011266, 10-2014-0038833, 10-2014-0133366, 10-2014-0143643, and 10-2014-0160369, respectively, the entire disclosure of each of which is hereby incorporated by reference.

TECHNICAL FIELD

The present disclosure relates to a mobile communication system. More particularly, the present disclosure relates to a multicarrier-based data transmission method and an apparatus for use in the mobile communication system.

BACKGROUND

Mobile communication systems were developed to provide mobile users with communication services. With rapid technological advancements, the mobile communication systems have evolved to the level capable of providing high speed data communication service beyond the early voice-oriented services.

Recently, standardization for a Long Term Evolution (LTE) system, as one of the next-generation mobile communication systems, is underway in the 3$^{rd}$ Generation Partnership Project (3GPP). LTE is a technology for realizing high-speed packet-based communications with the data rate of up to 100 Mbps, which is higher than the currently available data rate, and its standardization is almost complete.

Recent studies are focused on the LTE-Advanced (LTE-A) for improving data rate with the adoption of various new techniques to legacy LTE system. One of such technologies is Carrier Aggregation. Carrier Aggregation is a technology allowing a terminal to use multiple downlink carriers and multiple uplink carriers unlike the technology of the related art of using one downlink carrier and one uplink carrier for data communication.

The current release of LTE-A specifies only an intra-evolved Node B (eNB) carrier aggregation. This diminishes the applicability of carrier aggregation function and is likely to cause carrier aggregation failure especially in a scenario where a plurality of pico cells and one macro cell coexist.

Therefore, a need exists for a method and an apparatus for facilitating inter-eNB carrier aggregation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for facilitating inter-evolved Node B (eNB) carrier aggregation.

In accordance with an aspect of the present disclosure, a Radio Network Temporary Identity (RNTI) reception method of a terminal in a wireless communication system supporting inter-evolved Node B (eNB) carrier aggregation is provided. The method includes receiving cell information on at least one activated cell under control of an eNB, configuring first and second RNTIs allocated by the eNB, monitoring the at least one activated cell for the first RNTI, and monitoring a primary cell among the at least one activated cell for the second RNTI.

In accordance with another aspect of the present disclosure, a terminal for receiving Radio Network Temporary Identity (RNTI) in a wireless communication system supporting inter-evolved Node B (eNB) carrier aggregation is provided. The terminal includes a transceiver configured to transmit and receive signals to and from an eNB and a controller configured to receive cell information on at least one activated cell under control of an eNB, to configure first and second RNTIs allocated by the eNB, to monitor the at least one activated cell for the first RNTI, and to monitor a primary cell among the at least one activated cell for the second RNTI.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
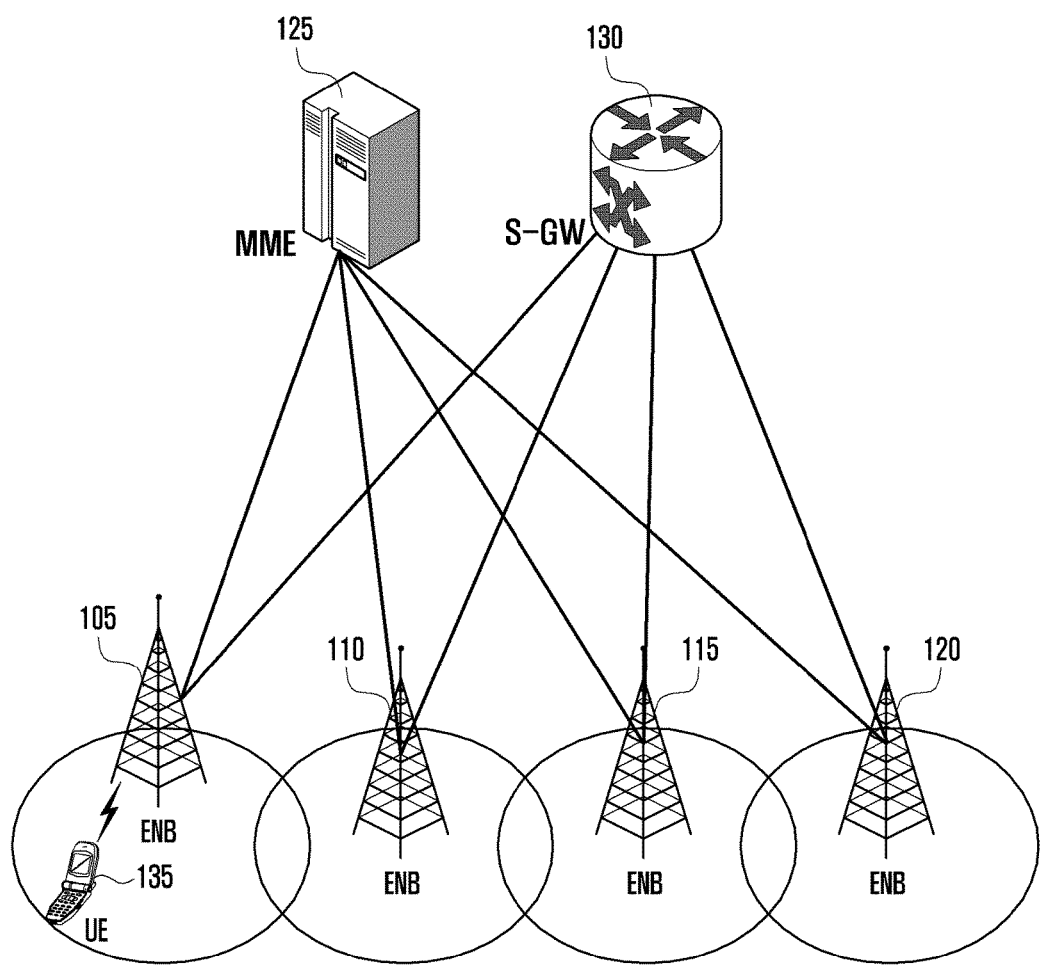
FIG. 1 is a diagram illustrating a Long Term Evolution (LTE) system architecture according to various embodiments of the present disclosure.

FIG. 1 is a diagram illustrating a Long Term Evolution (LTE) system architecture according to various embodiments of the present disclosure.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130.

The term 'eNB' is used interchangeably with terms 'node B' and 'base station.' The User Equipment (hereinafter, referred to as UE) 135 connects to an external network via eNBs 105, 110, 115, and 120 and the S-GW 130.

Referring to FIG. 1, the eNBs 105, 110, 115, and 120 correspond to the legacy node Bs of the UMTS system. The eNBs allow the UE 135 to establish a radio channel and are responsible for complicated functions as compared to the legacy node B. In the LTE system, all the user traffic including real time services, such as Voice over Internet Protocol (VoIP), is provided through a shared channel and thus there is a need of a device which is located in the eNB to schedule data based on the state information, such as buffer states, power headroom states, channel states of the UEs, and the like.

Typically, one eNB controls a plurality of cells. In order to secure the data rate of up to 100 Mbps, the LTE system adopts Orthogonal Frequency Division Multiplexing (OFDM) as a radio access technology. In addition, the LTE system adopts Adaptive Modulation and Coding (AMC) to determine the modulation scheme and channel coding rate in adaptation to the channel condition of the UE.

The S-GW 130 is an entity to provide data bearers so as to establish and release data bearers under the control of the MME 125. The MME 125 is responsible for UE mobility management and other control functions and may be connected to a plurality of eNBs.

Figure 2:
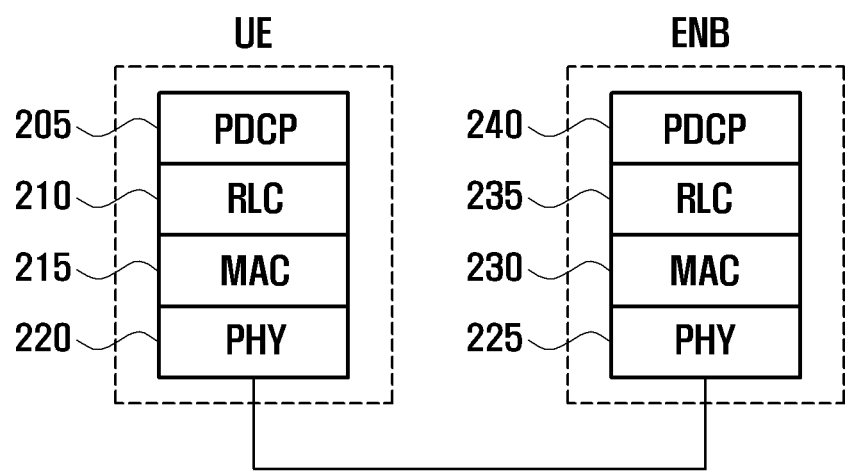
FIG. 2 is a diagram illustrating a protocol stack of an LTE system according to various embodiments of the present disclosure.

FIG. 2 is a diagram illustrating a protocol stack of an LTE system according to various embodiments of the present disclosure.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225.

The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
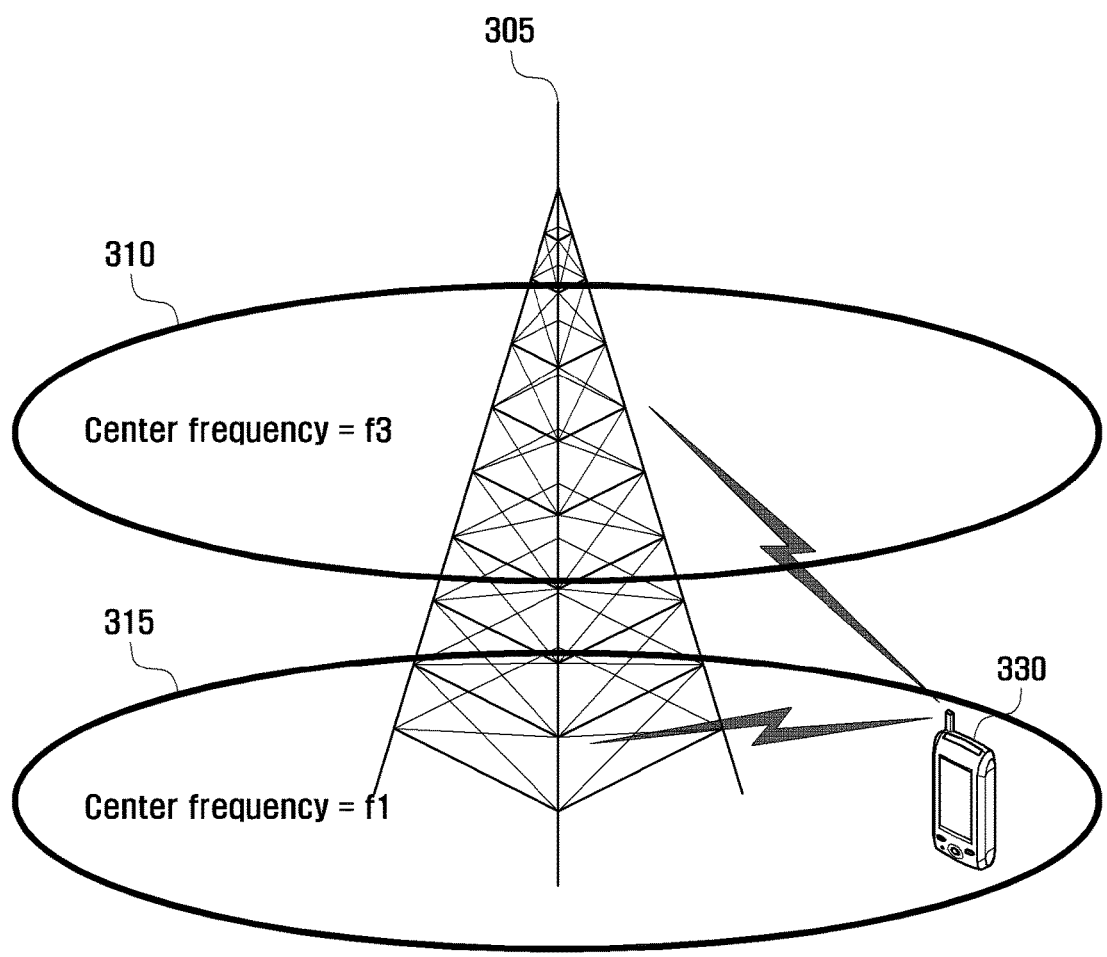
FIG. 3 is a diagram illustrating an intra-evolved Node B (eNB) carrier aggregation for a User Equipment (UE) according to an embodiment of the present disclosure.

FIG. 3 is a diagram illustrating an intra-eNB carrier aggregation for a UE according to an embodiment of the present disclosure.

Referring to FIG. 3, an eNB transmits and receives signals through multiple carriers across a plurality of frequency bands. For example, an eNB 305 can be configured to use the carrier 315 with center frequency f1 and the carrier 310 with center frequency f3. If carrier aggregation is not supported, a UE 330 has to transmit/receive data using one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE 330. This approach of aggregating the downlink carriers transmitted by or uplink carriers received by an eNB is referred to as inter-eNB carrier aggregation. However, there may be a situation requiring an approach of aggregating the downlink carriers transmitted by different eNBs or the uplink carriers received by different eNBs unlike the situation of FIG. 3.

Figure 4:
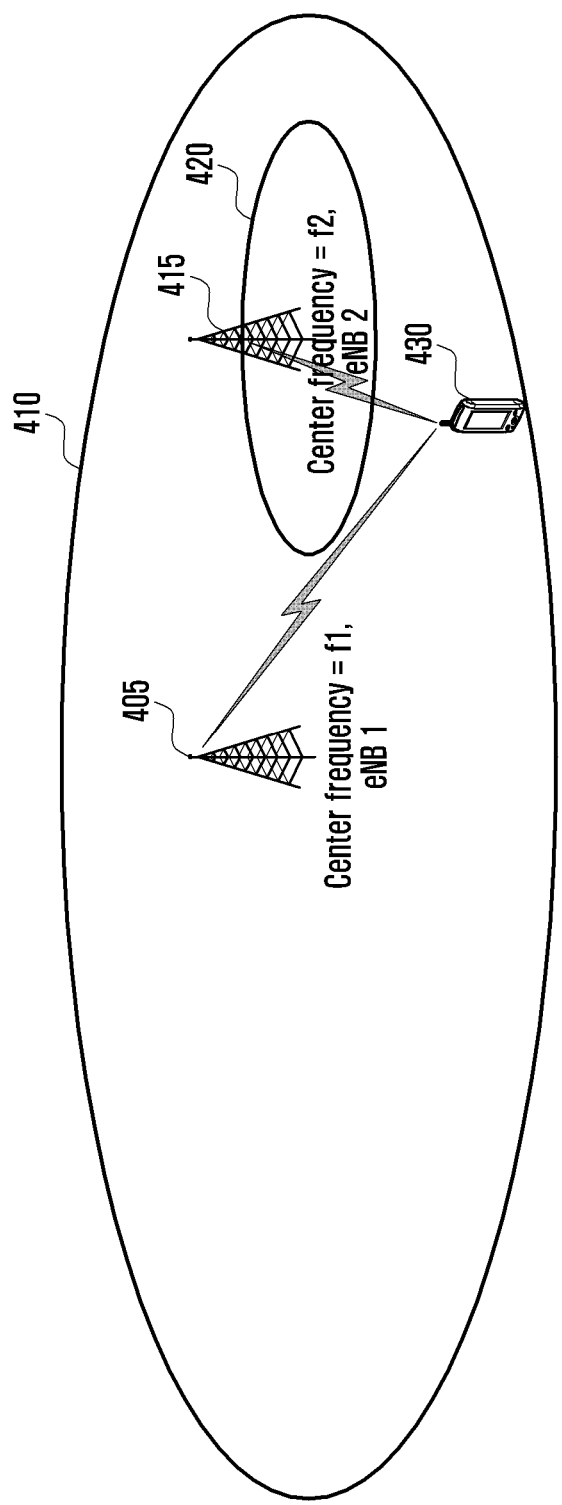
FIG. 4 is a diagram illustrating an inter-eNB carrier aggregation according to an embodiment of the present disclosure.

FIG. 4 is a diagram illustrating an inter-eNB carrier aggregation according to an embodiment of the present disclosure.

Referring to FIG. 4, assuming that an eNB 1 405 operates a carrier with the center frequency at f1 and an eNB 2 415 a carrier with the center frequency at f2, if a UE 430 aggregates the carrier with the downlink center frequency at f1 and the carrier with the downlink center frequency at f2, i.e., one UE 430 aggregates the carriers of two different eNBs, and this is referred to as inter-eNB Carrier Aggregation (CA) in an embodiment of the present disclosure. In the following description, the term 'Dual Connectivity (DC)' is used interchangeably with the term 'inter-eNB CA'. For example, if DC is configured, this indicates that the inter-eNB CA is configured.

The following definitions are provided to facilitate understanding of certain terms used frequently herein.

Assuming that a cell is configured with one downlink carrier and one uplink carrier of an eNB in a concept of the related art, the carrier aggregation can be understood as if the UE communicates data via multiple cells. At this time, the peak data rate and the number of aggregated carriers have positive correlation.

In the following description, if a UE receives data through a certain downlink carrier or transmits data through a certain uplink carrier, this indicates that the UE transmits/receives data through a control channel and a data channel provided by the cell corresponding to the center frequency and frequency band characterizing the carrier. In the following description, the carrier aggregation can be expressed like this 'a plurality of serving cells are configured' along with the use of the terms 'Primary Serving cell (PCell),' 'Secondary Serving cell (SCell),' 'activated service cell,' and the like. These terms are used in the same meaning as those used in the LTE mobile communication system. In following description, the terms 'carrier,' 'component carrier,' and 'serving cell' are used interchangeably in the same meaning.

In the following description, a set of the serving cells controlled by one eNB is referred to as a Cell Group or Carrier Group (CG). A cell group is classified into one of Master Cell Group (MCG) and Secondary Cell Group (SCG). The MCG denotes a set of the serving cell controlled by an eNB controlling the PCell (hereinafter, referred to as Master eNB (MeNB), and the SCG denotes a set of the serving cells controlled by the eNB which does not control the PCell, i.e., the eNB which controls SCells (hereinafter, referred to as Slave eNB (SeNB). The eNB notifies the UE whether a serving cell belongs to the MCG or SCG in the procedure of configure the corresponding serving cell. A UE may be configured with one MCG and one or more SCGs. Although the description is directed to the case where one SCG is configured for convenience purpose, the subject matter of the present disclosure can be applied, without modification, to the case where more than one SCG are configured. The PCell and SCell are terms expressing the types of the serving cell configured to the UE. The PCell and SCell are different in that the PCell remains in the activated state while the SCell transitions between the activated state and the deactivated state repeatedly according to the command of the eNB. The UE mobility is controls mainly in association with the PCell, and the SCell may be understood as an extra serving cell for data communication. In the following description, the terms Well' and 'SCell' are used in the same meaning as those defined in the LTE standards TS36.331 and TS 36.321.

The present disclosure is directed to the network in which the macro and pico cells coexist. The macro cell is the cell controlled by a macro eNB and has a relatively large service coverage area. In contrast, the pico cell is the cell controlled by the SeNB and has a small service coverage area as compared to the macro cell. Although there is no strict criterion for distinguishing between the macro and pico cells, it is assumed that the macro cell has a radius about 500 m while the pico cell has a radius about a few meters. In the following description, the terms 'pico cell' and 'small cell' are used interchangeably.

Referring to FIG. 4, if the eNB 1 405 is the MeNB and the eNB 2 415 is the SeNB, a serving cell 410 having the center frequency at f1 is the serving cell belonging to the MCG, and a serving cell 420 having the center frequency at f2 is the serving cell belonging to the SCG.

In the following description, other terms may be used interchangeably with MCG and SCG to help understanding. For example, the terms 'primary set' and 'secondary set' and 'primary carrier group' and 'secondary carrier group' may be used interchangeably. However, it is noted that they are different in spelling but the same in meaning. The main purpose of these terms is to clarify which cell is under the control of the eNB controlling the PCell of a specific UE, and the UE and the corresponding cell may operate differently depending on whether the corresponding cell is controlled by the eNB controlling the PCell of the specific UE or not.

Although the UE may be configured with one or more SCGs, the following description is directed to the case where one SCG is configured for explanation convenience. The SCG may include a plurality of SCells of which one has a special attribute.

In the intra-eNB CA, the UE transmits the HARQ feedback and CSI for the SCell(s) as well as the HARQ feedback and CSI for the PCell through the PCell PUCCH. This is to apply the CA to the UE having no simultaneous uplink transmission capability.

In the inter-eNB CA, it may be impossible to transmit the HARQ feedback and CSI of the SCG SCells on the PCell PUCCH. This is because although the HARQ feedback has to be delivered within the HARQ Round Trip Time (RTT) (typically 8 ms) the transmission delay between the MeNB and SeNB may be longer than the HARQ RTT.

In order to address this issue, PUCCH transmission resource is configured to one of the SCG SCells to transmit the HARQ feedback and CSI for the SCG SCells. This special SCell is referred to as primary S Cell (pSCell).

Since the MeNB and SeNB perform scheduling independently, the uplink transmission in the MCG and the uplink transmission in the SCG may be overlapped in the time domain. Since the uplink transmit power of the UE is limited, if the required transmit power is greater than the maximum allowed transmit power, the UE performs uplink transmission at a lowered transmit power level, resulting in degradation of uplink transmission quality.

If a scheduler performs uplink scheduling of the UE, the scheduler has to monitor to avoid the transmit power shortage as far as possible. In the inter-eNB CA, however, two schedulers perform scheduling independently it is difficult to rule out the occurrence of transmit power shortage situation.

The present disclosure proposes a method and an apparatus for minimizing the uplink transmission quality degradation when the transmit power shortage situation occurs in the inter-eNB CA mode.

Figure 5:
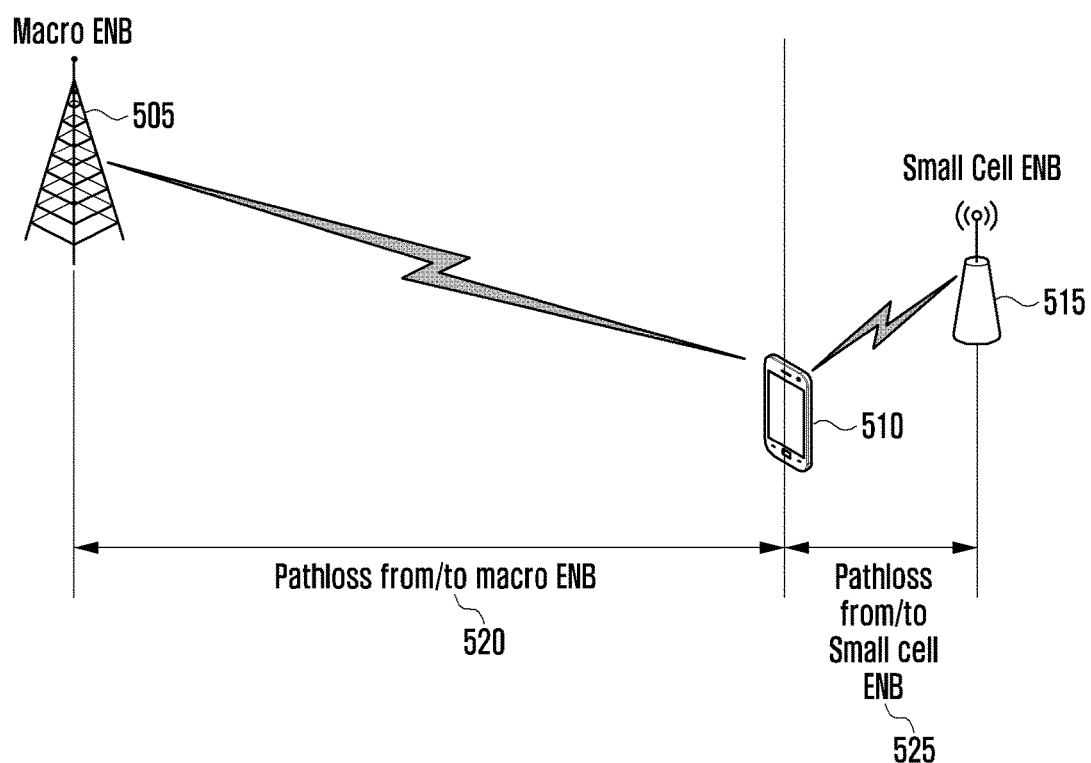
FIG. 5 is a diagram illustrating a macro cell uplink and a pico cell uplink according to an embodiment of the present disclosure.

FIG. 5 is a diagram illustrating a macro cell uplink and a pico cell uplink according to an embodiment of the present disclosure.

There may be a difference between the uplink transmit powers of the small and macro cells for the following reasons.

The probability of no existence of obstacle between the UE and the small cell receiver is noticeably higher than the probability of no obstacle between the UE and the macro cell receiver.

It is likely that the distance between the UE and the small cell receiver is shorter than the distance between the UE and the macro cell receiver.

If a transmission/reception device in the range of line of sight, this indicates that the communication quality is good as compared to the opposite situation and thus it is possible to reduce the transmit power level. The shorter the distance between the transmitter and the receiver is, the less the pathloss is and the lower the transmit power is.

Referring to FIG. 5, assuming that the distance between a UE 510 and an MeNB 505 is 250 m and the distance between the UE 510 and an SeNB 515 is 20 m, a pathloss 520 between the UE 510 and the MeNB 505 is 118.4 dB and a path loss 525 between the UE 510 and the SeNB 515 is 64.0 db. For example, the difference between the uplink signal strengths between the MeNB 505 and the SeNB 515 is 54.4 (about 275400 fold). Since the transmit power required to the UE increases as the pathloss to the eNB increases, the required transmit power of the UE for the MeNB 505 is greater noticeably than the required transmit power of the UE for the SeNB 515.

If the total required transmit power for the MeNB and SeNB is greater than the maximum allowed transmit power of the UE, the UE may perform the equal power scaling on the transmit powers for the two eNBs. If the required transmit power difference is noticeable between the MeNB and SeNB, the equal power scaling affects significantly worse influence to the transmission quality of the downlink of the low required transmit power.

For example, if a 336-bit VoIP packet is transmitted in the macro cell and a 36696-bit packet is transmitted in the small cell and if the distance between the UE and the MeNB is 500 m and the distance between the UE and the SeNB is 50 and if a Transmission Power Control (TPC) for increasing the transmit power as much as 3 dB is received, the required transmit powers for the MeNB (macro cell) and the SeNB (small cell) are determined as shown in Table 1.

TABLE 1

| Macro cell-required Tx power | 26.96 dBm/497.04 mW |
| Small cell-required Tx power | −7.65 dBm/0.17 mW |

Assuming that the maximum allowed transmit power of the UE is 20 dBm, if the equal power scaling is applied, the two transmit powers are determined as shown in Table 2.

TABLE 2

| macro cell Tx power | 20.0 dBm/99.97 mW | Transmission quality degradation of same strength (6.96 dB) occurs in both the macro and small cell transmissions. |

TABLE 2-continued

| small cell Tx power | −14.6 dBm/0.03 mW | |

Meanwhile, if only the highest required transmission power is reduced while the lowest required transmit power is maintained (i.e., differential power scaling), the transmit powers are determined as shown in Table 3.

TABLE 3

| macro cell Tx power | 19.99 dBm/99.83 mW | Transmission quality degradation of 6.97 db occurs in macro cell transmission. No transmission quality degradation occurs in small cell transmission. |
| small cell Tx power | −7.65 dBm/0.17 mW | |

As shown in the tables, when the required transmit power difference is significant, if the transmit power of the uplink of which required transmit power is very low is reduced, the total transmit power is affected little. However, if the transmit power of the uplink of which required transmit power is low is reduced, the transmission quality of the corresponding uplink degrades significantly. Accordingly, it is advantageous to decrease the transmit power of the uplink with the high required transmit power while maintain the transmit power of the uplink with the low required transmit power in view of the total transmission quality.

In the case that the UE operates in the macro cell, such an extreme transmit power inequality does not occurs. In the case that the UE performs uplink transmission in the macro and small cells simultaneously, such an extreme transmit power inequality is likely to occur.

As described above, one SCG may be configured with plural SCells and one MCG with plural serving cells. In the PCell and pSCell, the PUCCH and PUSCH may be transmitted simultaneously. For the case that various types of uplink channels are transmitted through a plurality of serving cells of multiple cell groups as above, the present disclosure proposes a 2-operation priority determination method for determining the priorities among the cells groups first and then the priorities among uplinks in the cell group. The 2-operation priority determination method of the present disclosure applies the differential power scaling rather than the equal power scaling for the same types of uplink transmissions according to the cell group.

Figure 6:
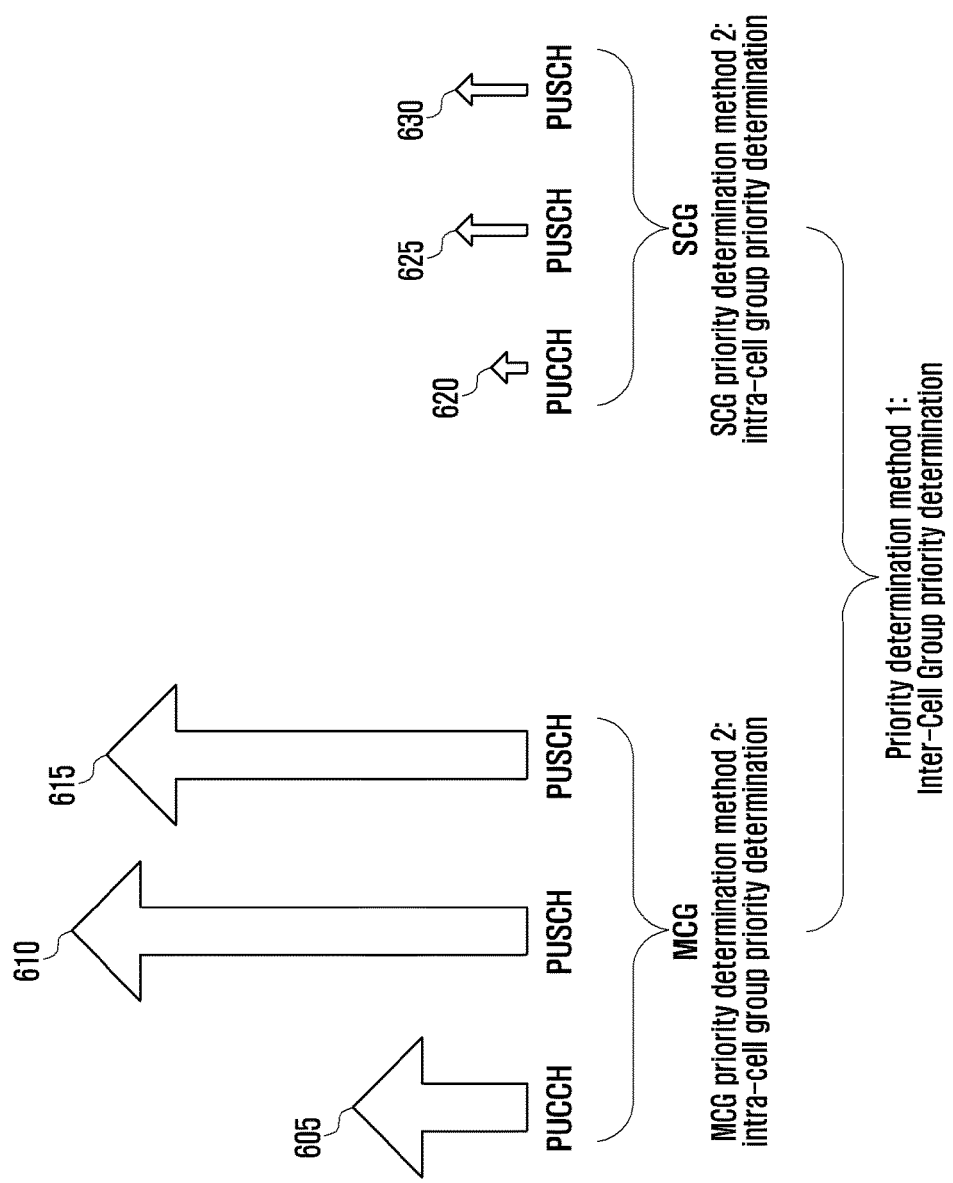
FIG. 6 is a diagram illustrating an uplink transmit power adjustment scheme according to an embodiment of the present disclosure.

FIG. 6 is a diagram illustrating an uplink transmit power adjustment scheme according to an embodiment of the present disclosure.

Referring to FIG. 6, it is assumed that uplink transmission is performed at a subframe in a serving cell of the MCG.

PUCCH transmission is performed in a PCell at operation 605,

PUSCH transmission is performed in one MCG serving cell at operation 610, and PUSCH transmission is performed in another MCG serving cell at operation 615.

In the embodiment of FIG. 6, it is also assumed that uplink transmission is performed at a subframe which is overlapped with the above subframe in whole or in part in an SCG serving cell.

PUCCH transmission is performed in a pSCell at operation 620,

PUSCH transmission is performed in one SCG SCell at operation 625, and

PUSCH transmission is performed in another SCG SCell at operation 630.

The UE determines the required transmit powers for the uplink transmissions. Referring to FIG. 6, the heights of the arrows representing the respective uplink transmission indicate the required transmit power levels of the respective uplink transmissions.

If the sum of the required transmit powers of the uplink transmissions is greater than the maximum allowed transmit power of the UE, the UE determines the priorities among the respective uplink transmissions in different operations to select the uplink transmission power to be reduced with priority.

The UE allocates priorities to the cell groups at the first operation and then determines the priorities among the uplink transmissions per cell group at the second operation. The UE reduces the transmit power of the uplink transmission with the low priority.

The UE may allocate priorities to the cell groups using one of the following methods.

Cell Group Priority Determination Method 1

The UE allocates to a cell group (e.g., an MCG) a priority higher than those of other cell groups.

In this case, since the important messages, such as RRC control messages, are transmitted through the MCG, it is preferred to allocate a high priority for MCG transmission.

Cell Group Priority Determination Method 2

The UE compares the sums of uplink required transmit powers of the cell groups and allocates a low priority to the cell group with the highest sum of the transmit powers and a high priority to the cell group with the lowest sum of the transmit powers.

For example, the sum of the required transmit powers in MCG corresponds to the sum of the required transmit powers of the uplink transmissions 605, 610, and 615, and the sum of the required transmit powers in SCG corresponds to the sum of the required transmit powers of the uplink transmissions 620, 625, and 630. Referring to FIG. 6, since the sum of the required transmit powers in MCG is greater than the sum of the required transmit powers in SCG, the UE allocates to the MCG a low priority.

As described above, it is advantageous to decrease the transmit power of the uplink with the high required transmit power rather than to decrease the transmit power of the uplink with the low required transmit power in view of the total transmission quality. Accordingly, it is preferred for the UE to allocate the low priority to the cell group with the high required transmit powers sum to reduce the transmit power with priority.

Cell Group Priority Determination Method 3

If the difference (or ratio) between the sums of uplink required transmit powers of the respective cell groups is equal to or greater than a certain threshold, the UE allocates the high priority to the uplink transmission of the cell group with the low uplink required transmission power and, otherwise if the difference (or ratio) is less than the threshold, the UE allocates the high priority to the uplink transmission of a cell group (e.g., an MCG).

The method 3 is conceived by taking notice that if the transmit power difference is noticeable it is preferred to reduce the transmit power of the uplink with the required high transmit power and, otherwise if the transmit power difference is not noticeable, it is preferred to reduce the transmit power of more important signal.

The UE determines the priorities among the uplink transmissions in each cell group as follows.

Intra-Cell Group Priority Determination Method

If PUCCH and PUSCH transmissions are overlapped, the UE allocates a high priority for the PUCCH transmission.

If the PUSCH transmissions are overlapped, the UE allocates a high priority to the PUCCH transmitted with the Uplink Control Information (UCI). If there is no PUSCH transmitted with UCI, the UE allocates the same priority for the PUSCH transmissions.

The UE decreases the transmit powers of the uplink transmission to which the same priority is allocated in the same degree. For example, the equal power scaling is applied to the transmit powers of the uplink transmission allocated the same priority. In the case that different priorities are allocated to the uplink transmissions, the transmit power of the uplink transmission with the low priority is reduced with priority. For example, the differential power scaling is applied to the transmit powers of the uplink transmissions allocated different priorities.

Table 4 shows a case of transmit power control according to the 2-operation priority determination in the case of applying the cell group priority determination method 3. Table 4 is directed to the case where the uplink required transmit power difference between MCG and SCG is equal to or greater than a certain threshold.

TABLE 4

| Maximum allowed transmit power of UE at a certain time point = 80.8 mW | | | | | | |
|---|---|---|---|---|---|---|
| | MCG | | | SCG | | |
| | PUCCH1 | PUSCH1 | PUSCH2 | PUCCH2 | PUSCH3 | PUSCH4 |
| Required Tx power | 50 mW | 100 mW | 200 mW | 0.01 mW | 0.02 mW | 0.05 mW |
| Tx power after adjustment | 50 mW | 10 mW | 20 mW | 0.01 mW | 0.02 mW | 0.05 mW |
| | No Tx power reduction | Equal power scaling | | No Tx power reduction | | |

Referring to FIG. 4, the maximum allowed transmit power of the UE is 80.8 mW, and the sum of the required transmit powers is 350.8 mW. The UE allocates priorities for determining the uplink transmission for which the transmit power is to be reduced.

The UE determines whether difference (ratio) between the total MCG required transmit power (350 mW) and the total SCG required transmit power (0.08 mW) is equal to or greater than a certain threshold (e.g., 20 dB). Since the difference between the total MCG required transmit power and the total SCG required transmit power is greater than the threshold, the UE allocates the high priority to the SCG uplink transmission of which total transmit power is low (determination operation 1).

The UE determines the priorities among the uplink transmissions in the MCG and the priorities among the uplink transmissions in the SCG. Among PUCCH 1 transmission, PUSCH 1 transmission (PUSCH transmission in a MCG serving cell), PUSCH 2 transmission (PUSCH transmission in another MCG serving cell) through MCG, the UE allocates the high priority for the PUCCH transmission and the low priority for the PUSCH 1 and PUSCH 2 transmissions. Among the PUCCH 2 transmission (PUCCH transmission in the pSCell), PUSCH 3 transmission (PUSCH transmission in an SCG serving cell), and PUSCH 4 transmission (PUSCH transmission in another SCG serving cell), the UE allocates the high priority for the PUCCH 2 transmission and the low priority to the PUSCH 3 and PUSCH 4 transmissions (second determination operation).

Since the cell group priority has priority over the cell priority, the final priorities are determined as follows:

The highest priority: PUCCH 2 transmission.
The second highest priority: PUCCH 3 and PUCCH 4 transmissions.
The third highest priority: PUCCH 1 transmission.
The lowest priority: PUSCH 1 and PUSCH 2 transmissions.

The UE reduces the transmit power of the uplink transmission with the lowest priority first. In the example of Table 4, the UE has to reduce the transmit power as much as 270 mW corresponding to the power amount which is obtained by subtracting the maximum allowed transmission power (80.08 mW) from the total required transmit power (350.08) by reducing the transmit powers of the PUSCHs 1 and 2 to $\frac{1}{10}$, it is possible to reduce the transmit power as much as 270 mW such that the UE reduces the transmit power as much as 270 mW by applying the equal power scaling to the PUSCHs 1 and 2 while maintaining the transmit powers for other uplink transmissions.

If the total required transmit power is greater than the maximum allowed transmit power of the UE after reducing the transmit power of the uplink transmission with the lowest priority to 0 mW, the UE controls the transmit power of the uplink transmission with the next lowest priority, i.e., the third highest priority.

The UE repeats the above process until the controlled total required transmit power is not greater than the maximum allowed transmit power of the UE.

Figure 7:
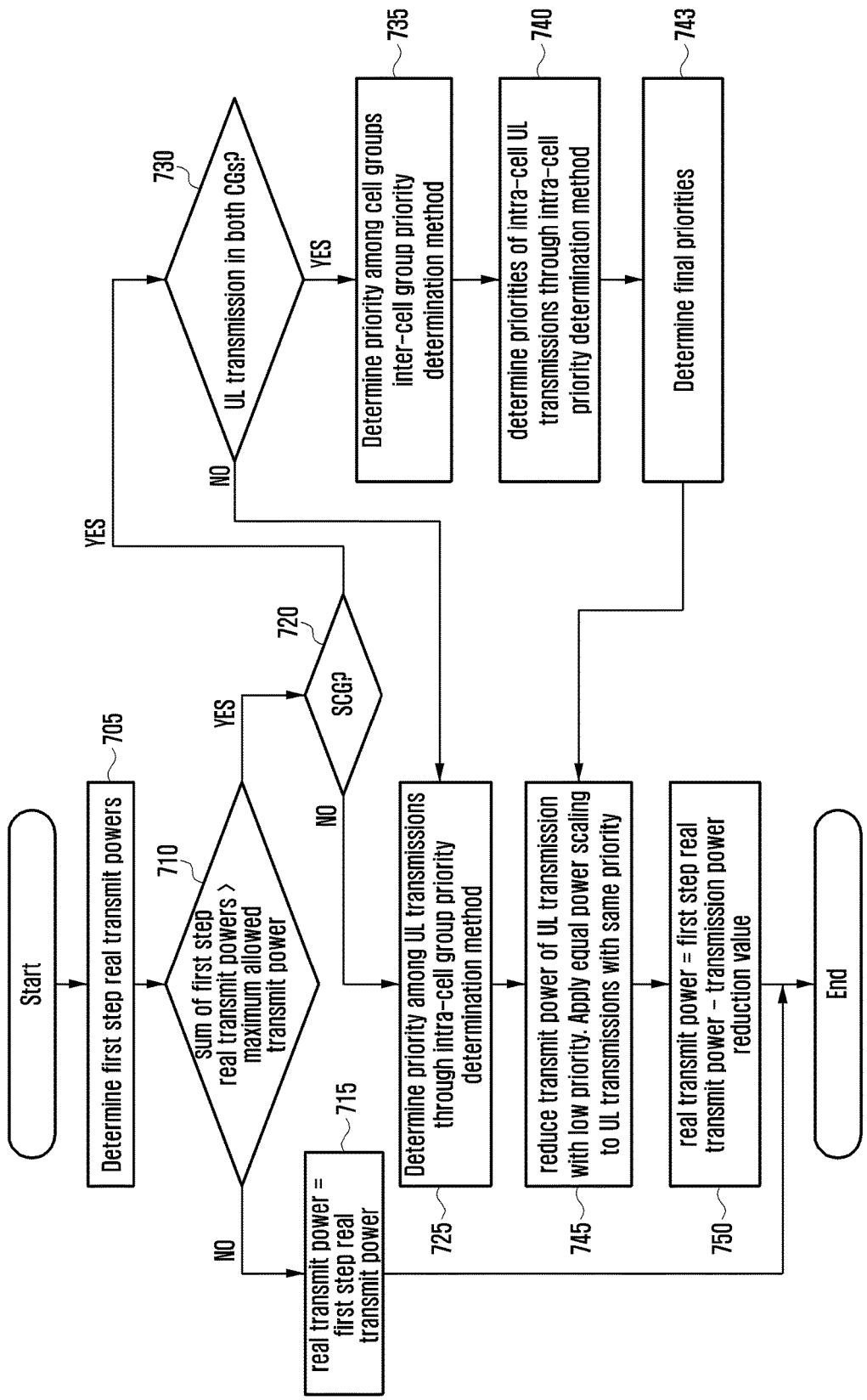
FIG. 7 is a flowchart illustrating an uplink transmit power control procedure of a UE according to an embodiment of the present disclosure.

FIG. 7 is a flowchart illustrating an uplink transmit power control procedure of a UE according to an embodiment of the present disclosure.

Referring to FIG. 7, if the UE receives an uplink grant, if there is uplink grant configured to the UE, if the UE has to perform retransmission, or if the UE has to transmit PUCCH, the UE operates as shown in FIG. 7. The configured uplink grant relates to the uplink transmission resource occurring periodically and complies with the 3$^{rd}$ Generation Partnership Project (3GPP) standard TS36.321.

The UE determines a first operation real transmit power for uplink transmission to be performed at a subframe at operation 705. If several uplink transmissions are scheduled, the UE determines the first operation real transmission power per transmission. The first operation real transmission power is the transmission power calculated per serving cell and is the smallest one between the required transmit power and the maximum allowed transmit power of the UE in the serving cell.

The required transmit power of PUSCH is calculated by Equation (1) based on the pathloss, PUSCH transmission bandwidth (or number of PRBs), PUSCH transmission format (Modulation and Coding Scheme (MCS), and Transmission Power Command (TPC). The calculation complies with the 3GPP standard TS 36.213.

$$10 \log_{10}(M_{PUSCH,c}(i)) + P_{0\_PUSCH,c}(j) + \alpha_c(j) \cdot PL_c + \Delta_{TF,c}(i) + f_c(i) \quad \text{Equation (1)}$$

Assuming the maximum allowed transmit power of the UE at subframe I in a serving cell c is $P_{CMAX,c}(i)$, the first operation real transmission power of PUSCH is calculated by Equation (2). The calculation complies with the 3GPP standard TS 36.213.

$$P_{PUSCH,c}(i) = \min \begin{cases} P_{CMAX,c}(i), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{cases} \quad \text{Equation (2)}$$

Assuming the maximum allowed transmit power of the UE at subframe I in a serving cell c is $P_{CMAX,c}(i)$, the first operation real transmission power of PUCCH is calculated by Equation (3). The calculation complies with the standard TX 26.213.

$$P_{PUCCH}(i) = \min \begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases} \quad \text{Equation (3)}$$

Briefly, the first operation real transmit power of PUCCH is determined based on the amount and format of the information transmitted on PUCCH. The first operation real transmission power is the real transmit power per serving cell and may be adjusted finally in accordance with the total maximum allowed transit power of the UE.

The UE compares the sum of the first operation real transmit powers and the maximum allowed transmit power $P_{CMAX}(i)$ of the UE at operation 710. The maximum allowed transmit power of the UE at a subframe i is determined based on the physical maximum output power and per-cell allowed value as specified in the standard TX 36.101.

If the sum of the first operation real transmit powers is not greater than the maximum allowed transmit power of the UE, there is no need of adjusting the transmit power and thus the UE sets the respective real uplink transmit powers to the first operation real transmit powers at operation 715 and ends the procedure.

If the sum of the first operation real transmit powers is greater than the maximum allowed transmit power of the UE, the procedure goes operation 720 to adjust the transmit powers. At operation 720, the UE determines whether any SCG is configured (or DC is configured or a plurality of CGs are configured) and, if any SCG is configured (or DC is configured or a plurality of CGs are configured), the procedure goes to operation 730 and, otherwise, operation 725.

At operation 730, the UE determines whether to perform uplink transmission through multiple cell groups (or through both the MCG and SCG) and, if so, the procedure goes to operation 735 and, otherwise, operation 725.

If the procedure goes to operation 725, this indicates that the uplink transmission is performed through one cell group and thus the UE does not need to determine the cell group priorities but the priorities among the uplink transmissions of the cell group. Otherwise if the procedure goes to operation 735, this means that the uplink transmission is performed through multiple cell groups and thus the UE has to determine the cell group priorities and then the per-cell group uplink transmissions priorities.

At operation 725, the UE determines the priorities among the uplink transmissions using the cell group priority determination method according to an embodiment of the present disclosure. The cell group priority determination method is performed as described above. For example, the UE may allocate to the PUCCH transmission a priority higher than that of the PUSCH transmission.

At operation 735, the UE determines the priorities of the cell groups using the cell group priority determination method according to an embodiment of the present disclosure. The cell group priority determination method is performed as described above. For example, if the difference (or ratio) between the sum of the first operation real transmit powers of MCG uplink transmissions and the sum of the first real transmit powers of the SCG uplink transmissions is less than a certain threshold, the UE allocates the high priority to the MCG uplink transmissions and, otherwise if the difference (or ratio) is equal to or greater than the threshold, allocates the high priority to the cell group of which the sum of the first operation real transmission powers is low (or the cell having the low first operation real transmission power, if the uplink transmission is performed through one cell).

The UE determines the priorities of the uplink transmissions in the cell group using the intra-cell group priority determination method according to an embodiment of the present disclosure at operation 740. If only one uplink transmission is scheduled in the cell group, operation 740 may be omitted.

The UE determines priorities among the uplink transmissions finally at operation 743. For example, the UE allocates the highest priority to the PUCCH transmissions or the PUCCH transmission including UCI in the cell group with the high priority, the next highest priority to the PUSCH transmissions in the cell group with the highest priority, the next highest priority to the PUCCH transmission or the PUSCH transmission including UCI in the cell group with the low priority, and the lowest priority to the PUSCH transmission in the cell group with the low priority.

At operation 745, the UE adjusts (controls) the transmit powers based on the priorities determined as above. The UE reduces the transmit power of the uplink transmission with the lowest priority first to maintain the sum of the transmit powers below the maximum allowed transmit power. If the sum of the transmit powers of the uplink transmission even after reducing the transmit power of the uplink transmission with the lowest priority to 0 mW, the UE adjust the transmit power of the uplink transmission with the next lowest priority. The UE repeats this process until the sum of the transmit powers is not greater than the maximum allowed transmit power.

The UE sets the final transmit powers of the corresponding uplink transmissions to the value obtained by reducing the first operation real transmit powers of the respective uplink transmissions at operation 750 and ends the procedure.

In an embodiment of the present disclosure, the UE may allocate priority to the PUCCH transmission independently of the cell group and apply the equal power scaling or the differential power scaling to the PUSCH transmissions. For example, if the sum of the first operation real transmit powers is greater than the maximum allowed transmit power of the UE, the UE may allocate the highest priority to the PUCCH and the PUSCH including UCI (i.e., it is possible to reduce the transmit power when the total required transmit power is greater than the maximum allowed transmit power even when the transmit power of the uplink transmission with the low priority is reduced to 0 mW). The UE may allocate the same priorities to the PUSCH transmissions (i.e., apply the equal power scaling) or, if the difference (or ratio) between the first operation real transmission powers is greater than a certain threshold, allocate the priority to the PUSCH transmission with low first real time transmit power (i.e., reduce the transmit power of the PUSCH with the high first operation real transmission power with priority. A description is made thereof in the following situation.

First operation real transmit power of uplink transmission to occur at certain time duration (e.g., one subframe), First operation real transmit power of the PCell PUCCH=$P_{PCellPUCCH}$ mW, First operation real transmit power of PUCCH of MCG SCell 1=$P_{SCell1}$ mW, First operation real transmit power of PUSCH of SCG SCell2=$P_{SCell2UCI}$ mW, First operation real transmit power of PUSCH of SCG SCell3=$P_{SCell3}$ mW, The PUSCH transmission of SCG SCell2 includes UCI, $P_{PCellPUCCH}+P_{SCell1}+P_{SCell2UCI}+P_{SCell3}>$PCMAX, and $P_{SCell1}/P_{SCell3}>$TH1 (e.g., centuple).

In the above case, since the highest priority is allocated to the PUCCH and PUSCH including UCI, the power headroom available for the MCG SCell 1 and SCG SCell 3 with the low priority is $[P_{CMAX}-(P_{PCellPUCCH}+P_{SCell2UCI})]$ mW.

Since the ratio between the PUSCH transmit powers of the MCG SCell 1 and the SCG SCell 3, the UE allocates a higher priority to the uplink transmission with the low transmit power. Accordingly, the power headroom available for the MCG SCell 1 with the lowest priority is $[P_{CMAX}-(P_{PCellPUCCH}+P_{SCell2UCI}+P_{SCell3})]$ mW.

If the power headroom is equal to or greater than 0, the UE adjusts the transmit power of the PCell 1 to configure the real transmit power of the SCell 1 and the transmit powers of the rest uplink transmissions at set to the first real transmit powers as they are. If the power headroom is less than 0, the required transmit power exceeds the maximum allowed transmit power of the terminal even though the real trans power of the SCell 1 is set to 0 and thus the UE sets the real transmit power of the SCell 1 to 0 and adjusts the transmit power of the uplink transmission, i.e., PUSCH of the SCell 3, with the priority higher than that of the PUSCH of the SCell 1. For example, if the calculation result is equal to or greater than 0, the UE adjusts the transmit power of the SCell 3 to $[P_{CMAX}-(P_{PCellPUCCH}+P_{SCell2UCI})]$ mW.

The UE repeats the above process until the sum of the controlled transmit powers becomes not greater than the maximum allowed transmit power.

Figure 8:
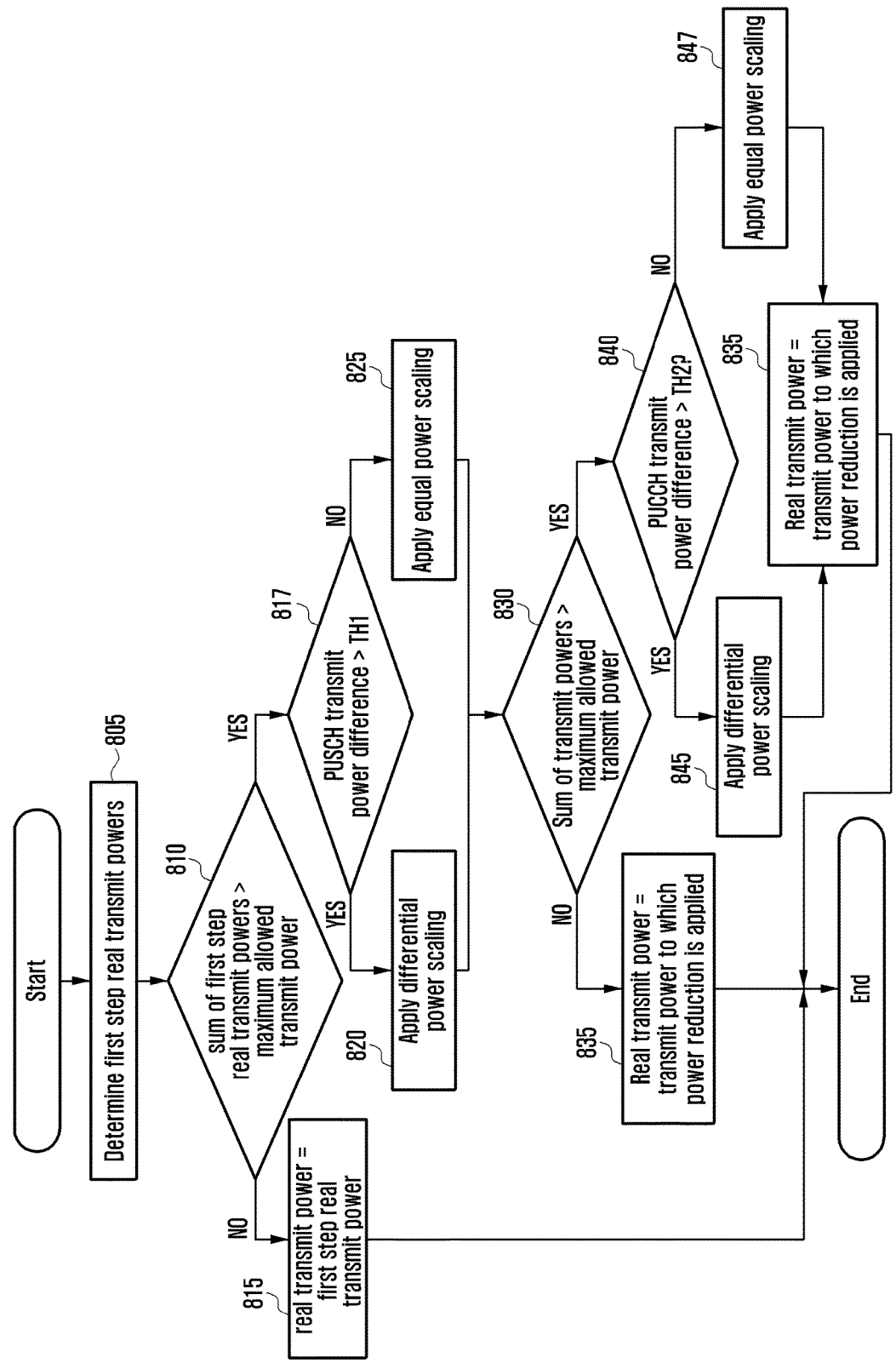
FIG. 8 is a flowchart illustrating an uplink transmit power control procedure of a UE according to an embodiment of the present disclosure.

FIG. 8 is a flowchart illustrating an uplink transmit power control procedure of a UE according to an embodiment of the present disclosure.

Referring to FIG. 8, the UE selects one of the equal power scaling and the differential power scaling depending on the difference between the transmit powers.

Operations 805, 810, and 815 are identical with operations 705, 710, and 715 in FIG. 7.

If the sum of the first operation real transmit powers is greater than the maximum allowed transmit power at operation 810, the procedure goes to operation 817. At operation 817, the UE determines whether the first operation transmit power difference between PUSCH transmissions, among the uplink transmissions, is greater than a certain threshold (TH1). At this time, the UE may consider the PUSCH transmissions including no UCI among the PUSCH transmissions. In the above described embodiment of the present disclosure, the UE compares $P_{SCell1}$ and $P_{SCell3}$ with each other and determined whether the ratio therebetween is greater than TH1. If the ratio or difference is greater than TH1, the UE applies the differential power scaling at operation 820 and, otherwise equal to or less than TH1, the equal power scaling at operation 825.

If there are more than two PUSCH transmissions, the UE takes ratios of all available combinations into consideration and applies the differential power scaling to the combinations that fulfils the above condition at operation 820 and the equal power scaling to the combinations that do not fulfil the above condition at operation 825. For example, if there are $P_{SCell\_x}$ (first operation real transmit power of SCell_x), $P_{SCell\_y}$, and $P_{SCell\_z}$, the UE determines whether there is any combination of which difference is greater than TH1 among the all available combinations [$P_{SCell\_x}$, $P_{SCell\_y}$], [$P_{SCell\_x}$, $P_{SCell\_z}$], and [$P_{SCell\_y}$, $P_{SCell\_z}$]. The UE applies the equal power scaling to the combination, e.g., [$P_{SCell\_x}$, $P_{SCell\_y}$], of which difference is greater than TH1 and the differential power scaling to the combination, e.g., [$P_{SCell\_x}$, $P_{SCell\_z}$], of which difference is equal to or less than TH1.

According to another embodiment of the present disclosure, one of all available combinations shows the difference greater than TH1, the procedure goes to operation 820 at which the UE applies the differential power scaling to all the PUSCH transmit powers and, when there is no combination showing the difference greater than TH1, the procedure goes to operation 825 at which the UE applies the equal power scaling.

According to another embodiment of the present disclosure, the UE determines whether apply the equal power scaling or differential power scaling based on the absolute values of the first operation real transmit powers. For example, the procedure goes to operation 820 for the uplink transmission of which transmit power is equal to or less than a certain threshold to apply the differential power scaling and operation 825 for the uplink transmission of which transmit power is greater than the threshold to apply the equal power scaling. For example, if the sum of the first operation real transmit powers at a certain time point is greater than $P_{CMAX}$, the UE applies the differential power scaling to the uplink transmission of which first operation real transmit power is equal to or less than a certain threshold and the equal power scaling to the uplink transmission of which first operation real transmit power is greater than the threshold. For example, if the first operation real transmit powers of PUSCH 1, PUSCH 2, PUSCH 3, and PUSCH 4 are 100 mW, 400 mW, 0.5 mW, and 0.9 mW respectively, and the certain threshold is 0 dBm (1 mW). The UE applies the differential power scaling to PUSCHs 3 and 4 of which first operation real transmit powers are less than 1 mW (i.e., allocates the high priority and dos not reduce the transmit powers before the transmit power of the uplink transmission with low priority decreases to 0 mW) and the equal power scaling to the PUSCHs 1 and 2 (i.e., allocates the low priority and reduces the transmit powers at the same rate).

If the differential power scaling is applied to an uplink transmission, this indicates that applying the high priority to the corresponding uplink transmission and to reduce the transmit power with the low priority first. If the equal power scaling is applied to an uplink transmission, this indicates that the low priority is applied to the corresponding uplink transmission to reduce the transmit powers of the uplink transmissions with the low priority at the same rate.

At operation 820, the UE applies the differential power scaling to the PUSCH transmit powers. For example, the UE reduces the transmit power of the PUSCH transmission with the highest transmit power and, if the transmit power shortage state is not resolved even after reducing the transmit power to 0 mW, reduces the next highest transmit power. This process is performed repeatedly until the transmit power shortage is resolved.

At operation 825, the UE applies the equal power scaling to the PUSCH transmit powers. For example, the UE reduces the PUSCH transmit powers at the same rate until the transmit power shortage state is resolved.

The UE determines whether the transmit power shortage state is resolved at operation 830 and, if resolved, the procedure goes to operation 835 and, otherwise, operation 840. At operation 835, the UE sets the uplink transmit power of the uplink transmission without power reduction to the first operation real transmit power and the uplink transmit power of the uplink transmission with power reduction to the value obtained by subtracting the reduced transmit power from the first operation real transmit power.

If the procedure goes to operation 840, this indicates that the transmit power shortage state is not resolved even though the PUSCH transmit power (except for PUSCH including UCI) is reduced to 0 mW and this the UE determined whether the difference between the first operation real transmit power of the PUCCH and the first operation real transmit power of the PUSCH including UCI is greater than a certain threshold TH2 to adjust the PUCCH transmit power. In the above-described embodiment of the present disclosure, the UE determines whether the difference between $P_{SCell2UCI}$ and $P_{PCellPUCCH}$ is greater than TH2. If the PUCCH is transmitted through both the MCG and SCG or if the PUSCH including UCI is transmitted through both the MCG and SCG, the UE determines whether the difference between their real transmit powers is greater than TH2.

If the first operation real transmit power difference between the two uplink transmissions is greater than TH 2, the UE applies the differential power scaling at operation 845 and, otherwise, the equal power scaling at operation 847.

The UE reduces the transmit power of the PUCCH transmission or PUSCH transmission including UCI which is allocated the high priority first at operation 845. The UE reduces the transmit powers of the PUCCH transmissions at the same rate at operation 847. In addition, the UE may reduce the transmit powers of the PUCCH transmission and the PUSCH transmission including UCI at the same rate.

In another approach, the UE determines the absolute values of the first operation real transmit powers of PUCCH and PUSCH including UCI instead of considering the difference between the first operation real transmission power of the PUCCH and the first operation real transmit powers of the PUSCH including UCI. In this case, it is possible to apply the low priority to the uplink transmission of which transmit power absolute value is greater than another threshold (e.g., 2 mW) to reduce its transmit power first and to apply the high priority to the uplink transmission of which transmit power absolute value is equal to or less than the threshold subsequently to reduce it transmit power. If the first operation real transmit powers of the two uplink transmissions are greater than the threshold, the UE applies the equal power scaling to the two uplink transmissions.

Figure 13:
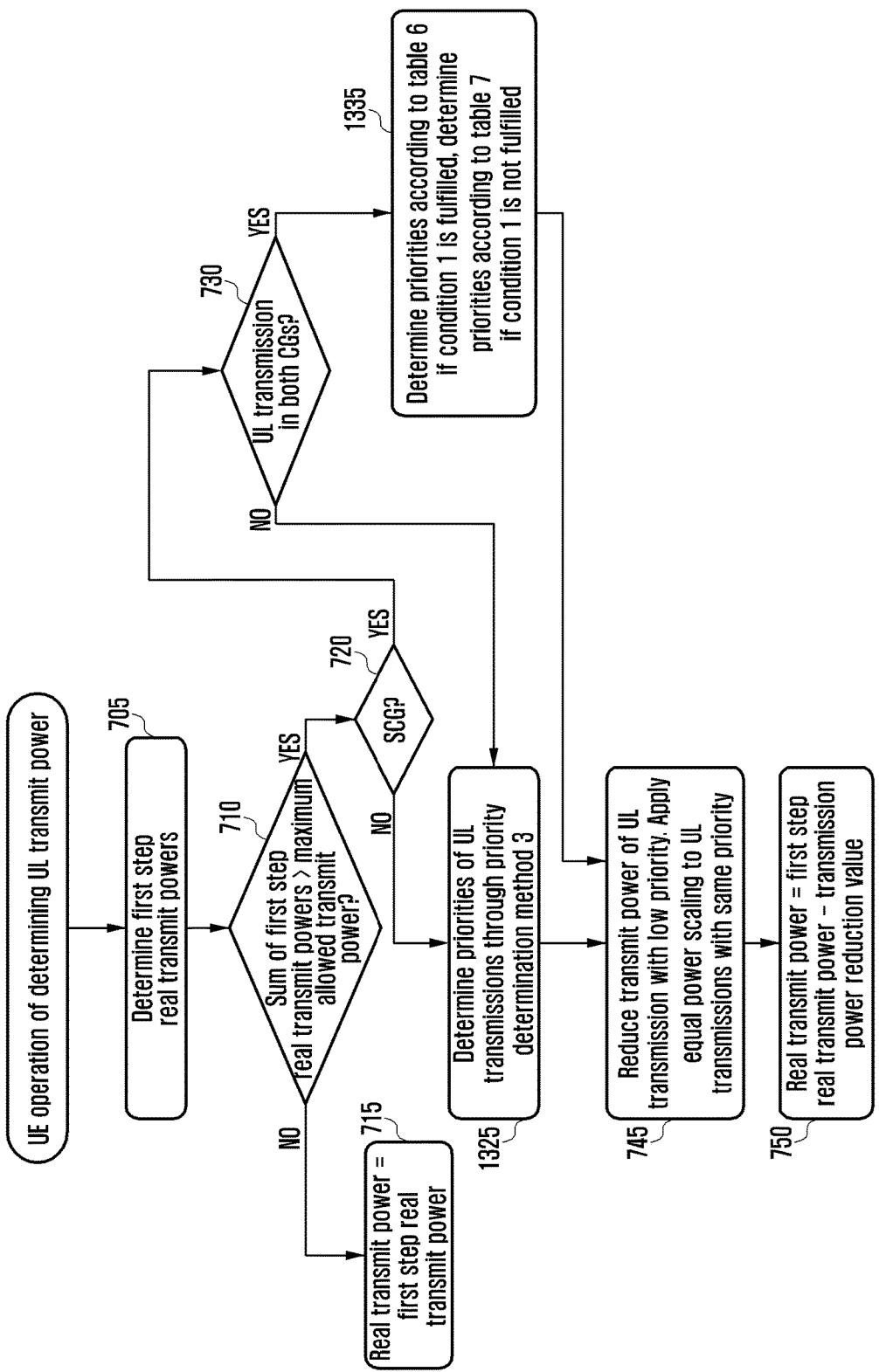
FIG. 13 is a flowchart illustrating an uplink transmit power control procedure of a UE according to an embodiment of the present disclosure.

FIG. 13 is a flowchart illustrating an uplink transmit power control procedure of a UE according to an embodiment of the present disclosure.

Referring to FIG. 13, the UE determines the priorities among the uplink transmissions based on their importance.

The uplink transmissions of the UE can be classified as shown in Table 5. The details of the signals enumerated herein comply with the 3GPP standard TS36.211, 36.212, 36.213, and 36.321.

TABLE 5

| | |
|---|---|
| Preamble | This is a UL signal for random access. Part of the UL transmission resource is reserved for preamble transmission. The UE can transmit preamble in a PCell, a pSCell, or an SCell having random access information. |
| Scheduling Request | This is a UL signal for transmission resource request. Part of the PUCCH resource can be allocated to UE as SR transmission resource. The UE can transmit SR in a PCell or a pSCell. |
| HARQ feedback | This is the HARQ feedback signal corresponding PDSCH and transmitted on the PUSCH resource of a PCell or a pSCell. |
| CSI (Channel State Information) | This is a signal indicating DL signal quality. Part of the PUCCH resource may be allocated to the UE as CSI transmission resource. The UE can transmit CSI in a PCell or a pSCell. |
| SRS (Sounding Reference Signal) | This is a reference signal transmitted by UE in uplink for use in uplink channel estimation at the eNB. SRS can be configured to all serving cells and transmitted at the last symbol of PUSCH transmission resource. |
| PUSCH | This is the UL channel carrying user data (MAC PDU). |

If DC is configured, various uplink signals may collide one another. The UE determines the collided signals and determines the priorities among the uplink signals.

The basic principle is to allocate, to the uplink signal which is likely to be concerned with RRC control message transmission, a priority higher than those of other uplink signals because the very important data, e.g., an RRC control message, may be transmitted through the MCG. Examples of the uplink signal which is likely to be concerned with the RRC control message transmission include the preamble transmitted in the PCell, the scheduling request transmitted in the PCell, and PUSCH transmitted in an MCG service cell.

FIG. 6 shows the priorities among the uplink signals according to an embodiment of the present disclosure.

The MCG ACK/NACK (A/N) (HARQ feedback) is likely to be a feedback corresponding to an RRC message. Accordingly, it is preferred to allocate to the MCG A/N a priority higher than those of other SCG uplink signals. However, since the SCG CSI is important information guaranteeing the efficiency of large volume PDSCH transmission in the SCG, the priority is given to the SCG CSI when the MCG A/N and SCG CSI collide.

Since the MCG is likely to be used to transmit small data, such as RRC messages, the MCG CSI is not so important. Accordingly, when the MCG CSI and SCG CSI collide or the MCG CSI and the SCG preamble collide, a low priority is allocated to the MCG CSI.

The SRS may be classified into one of Periodic SRS and aperiodic SRS (A-SRS) and, when the MCG SRS and the SCG SRS collide and one of them is A-SRS, the priority is given to the A-SRS. This is because the A-SRS transmission is commanded by the eNB and thus is more important than the periodic SRS which is transmitted by the UE autonomously. When both the SRSs are A-SRSs or when none of the SRSs are A-SRSs, the priority is given to the MCG SRS. This is because the MCG uplink channel state is likely to be more important than the SCG uplink channel state.

If there is no doubt that the MCG preamble, SR, and PUSCH are not related to the RRC control message, e.g., if the MCG SR or the buffer status report triggered random access is not triggered by occurrence of an RRC control message but the RRC control message is contained in the MAC PDU related to the PUSCH transmission, the priorities are determines by applying Table 7.

The basic principle that the priority is allocated in the order of preamble transmission, HARQ A/N transmission, SR transmission, CSI transmission, PUSCH transmission, and SRS transmission, when the uplink transmissions collide one another and, if the same types of transmissions collide, determine priorities thereof based on the transmission type. The priority is given to MCG A/N in collision between MCG A/N and SCG A/N, MCG SR in collision between MCG SR and SCG SR, SCG CSI in collision between MCG CSI and SCG CSI, and MCG PUCCH in collision MCG PUSCH and SCG PUSCH, and, in collision between SRSs, according to the rule in Table 7.

TABLE 6

| Priorities between | | SCG | | | | |
|---|---|---|---|---|---|---|
| MCG UL and SCG UL | | Preamble | SR | A/N | CSI | SRS | PUSCH |
| MCG | Preamble | Allocate priority to MCG Preamble transmission | | | | | |
| | SR | Allocate priority to MCG SR transmission | | | | | |
| | A/N | MCG A/N | MCG A/N | MCG A/N | SCG CSI | MCG A/N | MCG A/N |
| | CSI | SCG Preamble | SCG SR | SCG A/N | SCG CSI | MCG CSI | MCG CSI |
| | SRS | SCG Preamble | SCG SR | SCG A/N | SCG CSI | A-SRS | SCG PUSCH |
| | PUSCH | Allocate priority to MCG PUSCH transmission | | | | | |

TABLE 7

| Priorities between | | SCG | | | | |
|---|---|---|---|---|---|---|
| MCG UL and SCG UL | | Preamble | A/N | SR | CSI | SRS | PUSCH |
| MCG | Preamble | MCG Preamble | Preamble A/N | Preamble A/N | Preamble A/N | Preamble A/N | Preamble A/N |
| | A/N | Preamble | A/N | A/N | A/N | A/N | A/N |
| | SR | Preamble | A/N | MCG SR | SR | SR | SR |
| | CSI | Preamble | A/N | SR | SCG | CSI | CSI |
| | SRS | Preamble | A/N | SR | CSI | A-SRS | PUSCH |
| | PUSCH | Preamble | A/N | SR | CSI | PUSCH | MCG |

FIG. 13 is a flowchart illustrating an uplink transmit power control procedure of a UE according to an embodiment of the present disclosure. FIG. 13 is directed to the UE operation for uplink transmission at a subframe.

Since operations 705, 710, 715, 720, 730, 745, and 750 are identical with those of FIG. 7, descriptions thereof are omitted herein.

At operation 1325, the UE determines the priorities of the uplink transmissions according to the priority determination method 3 (embodiment of FIG. 13). The priority determination method 3 allocates priority in the order of preamble transmission, HARQ A/N transmission, SR transmission, CSI transmission, PUSCH transmission, and SRS transmission.

At operation 1335, if condition 1 is fulfilled, the UE determines the priorities according to Table 6 and, otherwise, Table 7. If one of the MCG preamble transmission, SR transmission, and PUSCH transmission relates to the RRC control message transmission, condition 1 is fulfilled and, otherwise, condition 1 is fulfilled. After determining the priorities according to Table 6 or 7, the procedure goes to operation 745.

Operations 740 and 705 are identical with those of FIG. 7.

Figure 9:
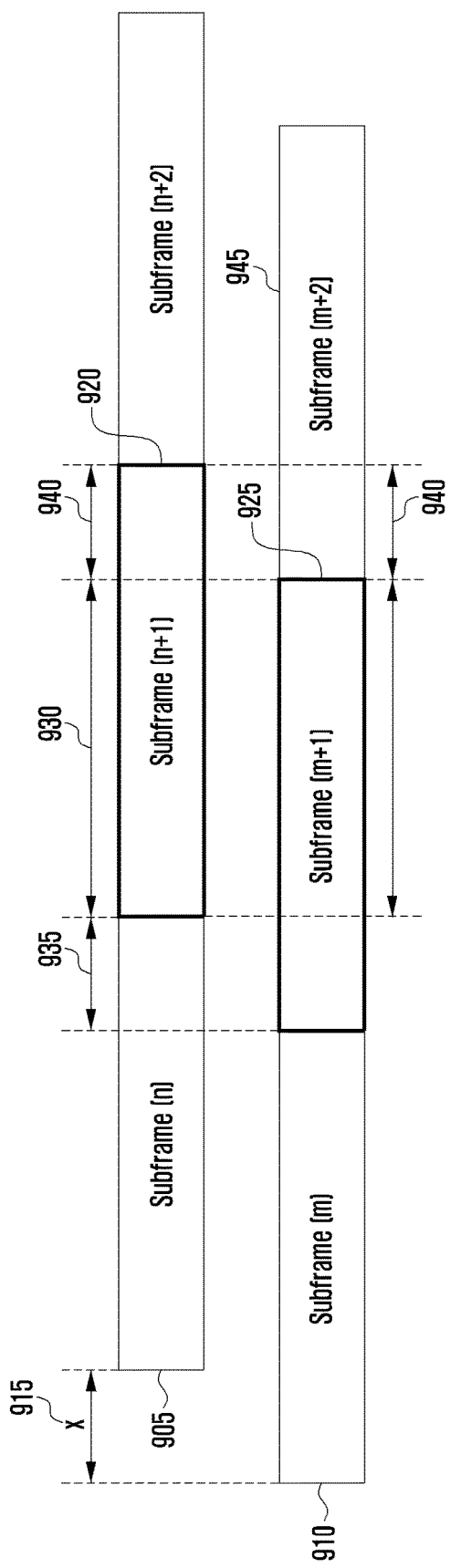
FIG. 9 is a diagram illustrating a situation where two uplink subframes are not aligned according to an embodiment of the present disclosure.

FIG. 9 is a diagram illustrating a situation where two uplink subframes are not aligned according to an embodiment of the present disclosure. The uplink subframe boundaries of the different cell groups may mismatch.

Referring to FIG. 9, the boundary of the subframe 905 of the MCG service cells and the boundary of the subframe 910 of the SCG serving cells are dislocated as much as x as denoted by reference number 915, one MCG subframe is overlapped with tow SCG subframes on the time axis. For example, the MCG subframe [n+1] 920 is overlapped with the SCG subframe [m+1] 925 and the SCG subframe [m+2] 945.

When determining the priorities of the uplink transmit powers at a subframe, the UE determines the uplink transmit power based on the subframe selected among a plurality subframes overlapped with the subframe according to a certain rule.

For example, if the MCG subframe [n+1] 920 carries PUSCH, the SCG subframe [m+1] 925 carries PUCCH, and SCG subframe [m+2] 945 carries nothing, the UE determines the transmit power of the MCG subframe [n+1] 920 based on the transmit power of the subframe which is more overlapped with the subframe [n+1] 920 in the time domain. Since the duration 930 overlapped between the subframe [n+1] 920 and the subframe [m+1] 925 is longer than the duration 940 overlapped between the subframe [n+1] 920 and the subframe [n+2] 945, the UE determines the transmit power of the subframe [n+1] 920 based on the transmit power and transmission type (uplink data type, such as PUCCH, PUSCH, PUSCH including UCI, and the like) of the subframe [m+l] 925.

Similarly, since the duration 930 overlapped between the subframe [m+1] 925 and the subframe [n+1] 920 is longer than the duration 935 overlapped between the [m+1] 925 and the subframe [n] 905, the UE determines the transmit power of the subframe [m+1] 925 based on the transmit power and transmission type of the subframe [n+1] 920.

In the case of considering the subframe which is more overlapped in the time domain, it may occur that the sum of the transmit powers is greater than the maximum allowed transmit power in the duration less overlapped subframe (e.g., duration 940). If the transmit power shortage occurs in the less overlapped duration, the UE may apply the equal power scaling to adjust the transmit power in the corresponding duration.

Figure 10:
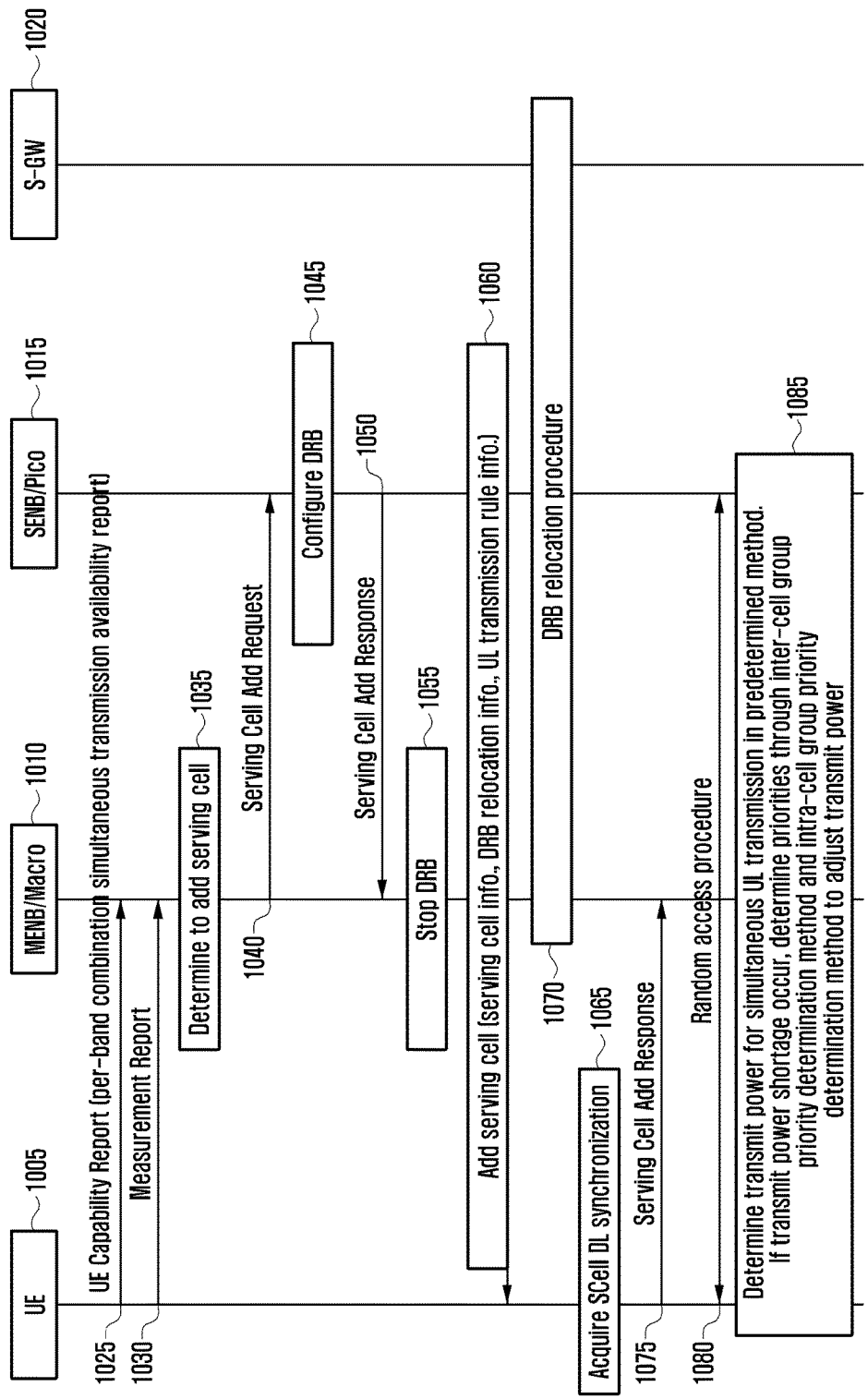
FIG. 10 is a signal flow diagram illustrating a signal processing procedure for transmitting signals using multiple carriers at a UE in a mobile communication system according to an embodiment of the present disclosure.

FIG. 10 is a signal flow diagram illustrating a signal processing procedure for transmitting signals using multiple carriers at a UE in a mobile communication system according to an embodiment of the present disclosure.

Referring to FIG. 10, if a certain condition is fulfilled in the LTE network, a UE 1005 reports its capability to an MeNB 1010 at operation 1025. The condition is fulfilled representatively when the eNB request the UE 1005 for UE capability.

The UE capability report message includes the information as follows.

List of frequency bands supported by UE 1005,

List of frequency band combinations supported by UE 1005, and

MIMO capability per frequency band combination.

In an embodiment of the present disclosure, the UE 1005 reports the information indicating whether DC is supported per frequency band combination supported by the UE 1005 along with the above information. The DC supportability is reported for the frequency band combination fulfilling a certain condition. For example, if the DC supportability for the frequency band combination in the same band (or combination having one band entry, hereinafter referred to as intra-band combination) is not reported explicitly, this indicates that the DC is not supported for the corresponding frequency band combination. The DC may be supported for the frequency band combination across different bands (or combination having two or more band entries, hereinafter referred to as inter-band combination). The UE 1005 may reduce the size of the message by marking whether it support DC per band combination for the inter-band combination.

If a certain event, e.g., if channel quality of a pico cell fulfils a certain condition, in the middle of data communication with the MeNB 1010 in the macro cell are, the UE 1005 generates and transmits a measurement report to the MeNB 1010 at operation 1030.

At this time, the measurement report message includes the information as follows.

Identifier of the cell of which channel quality fulfils a certain condition (e.g., physical layer cell identifier or Physical Cell ID (PCI), and Channel quality or reference signal strength of the corresponding cell.

If the measurement report message is received from the UE 1005, the MeNB 1010 becomes aware that the UE 1005 is in the pico cell area. The MeNB 1010 determines to configure a pico cell (serving cell) to the UE 1005 at operation 1035. The data transmission/reception through the pico cell is more efficient to the data transmission/reception through the macro cell in various respects. Accordingly, if the UE 1005 is located within the pico cell area, it is preferred for the eNB to configure the pico cell in which the UE 1005 is located as a new serving cell.

The MeNB 1010 determines an SeNB 1015 controlling the pico cell by referencing the identifier of the pico cell and transmits to the SeNB 1015 a control message requesting to add a serving cell at operation 1040.

The control message transmitted for serving cell add request includes the information in Table 8.

TABLE 8

| Name | Description |
| --- | --- |
| SCell ID Information | This is the information related to the identifiers of the S Cells to be configured by SeNB. This includes one or more SCellIndex-r10. This is determined by the MeNB and sent to the SeNB to prevent the identifier in use by the MeNB from being reused. |
| TAG ID Information | This is the information related to the identifier of TAG to be configured by SeNB. This is determined by the MeNB and sent to the SeNB to prevent the identifier in use by the MeNB from being reused. |
| UL scheduling information | This includes the priority information of the logical channels configured at the UE and logical channel group information. The SeNB interprets the buffer status report information of the UE and performs uplink scheduling based on this information. |
| Data rate information | This is the DL/UL predicted data rate information. The SeNB determines whether to accept or reject the SCell add request based on this information. |
| Information on DRB to be served by SeNB | The DRB (Data Radio Bearer) is the radio bearer established for processing user plane data. If the UE enters a pico cell area, all user plane data or most user plane data are processed preferably through the pico cell. The MeNB transmits to the SeNB the information on the DRBs to be processed through the pico cell, e.g., PDCP configuration information (PDCP header structure, header compress protocol information, and the like), RLC information (RLC operation mode, timers, and the like), logical channel information (logical channel identifier, priority, and the like). The SeNB determines the final DRB configuration information based on the above information. |
| Measurement quality information of serving cell requested to be configured additionally | The UE report the channel quality information transmitted in the measurement report message to the SeNB. The SeNB determines whether to accept or reject the serving cell add request based on this information and the data rate information. |

The SeNB 1015 determines whether to accept or reject the serving cell add request based on the serving channel information and UE data rate information.

If it is determined to accept, the SeNB 1015 establishes one or more DRBs at operation 1045. Afterward, the SeNB 1015 processes the data transmitted by and to be transmitted to the UE 1005 through the DRB.

If the SeNB 1015 establishes a DRB, this indicates to establish PDCP and RLC entities for processing data requiring a certain QoS. The DRB configuration may be identical with or different from the original configuration notified by the source eNB (HeNB) 1010.

The SeNB 1015 transmits to the MeNB 1010 a control message for accepting the SCell add request at operation 1050. This control message includes the information in Table 9.

TABLE 9

| Name | Description |
| --- | --- |
| SCellToAddMod | This is the information on the SCells configured in the SeNB and includes the information as follows. SCellIndex-r10, cellIdentification-r10, radioResourceConfigCommonSCell-r10, radioResourceConfigDedicatedSCell-r10, and TAG information. |
| PUCCH information for 7pSCell | Physical Uplink Control Channel (PUSCH) is configured in at least one of the SCells belonging to SCG. The UL control information, such as HARQ feedback, Channel Status Information (CSI), Sounding Reference Signal (SRS), and Scheduling Request (SR) are transmitted on PUCCH. The SCell in which PUCCH is transmitted is referred to as PUCCH SCell hereinafter. This information includes sub-information, such as PUCCH SCell identifier and PUCCH configuration information. |
| Information for data forwarding | This is the information on the logical channel for use in data exchange between MeNB and SeNB and includes GPRS Tunnel Protocol (GTP) tunnel identifiers for the respective DL and UL data exchanges. |
| UE identifier | This is C-RNTI to be used by the UE in the SCG SCell. |
| DRB configuration information | If identical with the DRB configuration used in the MeNB, this may be omitted. |
| List of DRBs to be relocated | DRB relocation is described below. If the locations of all the DRBs are reconfigured, this information may be omitted. |
| Scheduling information processing-related information | This is the information related to scheduling, such as Buffer Status Report (BSR) and Power Headroom Report (PHR), e.g., triggering condition and periodic report cycle information. If identical with the information of MeNB, this information may be omitted. |

The MeNB 1010 receives the SCell add response message from the SeNB 1015 and stops downlink operation of the DRB to be relocated at operation 1055. For example, the downlink data transmission stops on the DRB. However, the uplink data processing on the DRB is continued.

The MeNB 1010 generates an RRC control message for serving cell add request and transmits this message to the UE 1005 at operation 1060. This control message includes the information in Table 10.

TABLE 10

| Name | Description |
| --- | --- |
| SCellAddMod | The information transmitted by the SeNB is contained without modification. For example, SCellAddMod is identical with that of Table 3. SCellAddMod is contained per SCell and sub-information of an SCellAddModList. |
| PUCCH information for pSCell | The information transmitted by the SeNB is contained without modification. For example, PUCCH information for pSCell is identical with that of Table 3. |
| SCGSCell List | This is the information on the SCells belonging to the SCG among the configured SCells. This may include SCell identifiers and identifiers of the TAGs belonging to the SCG. |
| UE identifier | This is C-RNTI to be used by the UE in the SCG SCell. |
| DRB configuration information | Information transmitted by the SeNB at operation 1050 |
| List of DRBs to be relocated | Information transmitted by the SeNB at operation 1050 |
| Scheduling information processing-related information | Information transmitted by the SeNB at operation 1050 |
| Transmit power adjustment information | Thresholds for transmit power control, such as TH1 and TH2. This is the information notifying the uplink transmission to which the priority is given among the MCG and SCG uplink transmissions. |

The above information is coded in the ASN. 1 coding scheme and then transmitted to the UE 1005.

Upon receipt of the control message, the UE 1005 acquires downlink synchronization with the newly configured SCell at operation 1065. Next, if a random access procedure for SCell is prepared, the UE 1005 transmits to the MeNB 1010 a serving cell add response control message at operation 1075.

More specifically, if the serving cell add response message is generated, the UE 1005 transmits D-SR in the PCell or initiates random access procedure in the PCell to request for resource allocation to transmit the serving cell add response control message. If the uplink resource is allocated by of cell of the MCG, the UE transmits to the MeNB 1010 the serving cell add response control message using the allocation resource.

If an HARQ ACK or an RLC ACK is received in correspondence to the serving cell add response control message, the UE starts the random access procedure in a serving cell of the SCG at operation 1080. The SCG serving cell to perform the random access procedure is determined according to the following method.

Method of Determining SCG Cell for Random Access Procedure

If there is one serving cell to which the random access information is configured among the SCG serving cells, the UE performs the random access in the corresponding serving cell.

If there is more than one serving cell to which the random access information is configured among the SCG serving cells and the random access information-configured cells includes the pSCell, the UE performs the random access in the pSCell.

In the random access procedure, the UE 1005 transmits a preamble at a subframe on a frequency resource of the serving cell, receives a response message in response to the preamble, and performs uplink transmission based on the control information included in the response message.

If the random access procedure is completed as described above, the SeNB 1015 determines that the UE is capable of data communication in the SCG SCell and schedules the UE 1050.

If it is necessary to perform multiple uplink transmissions simultaneously, the UE determines whether the uplink transmissions are intra-cell group transmissions and, if intra-cell group transmissions, determines the priorities of the uplink transmissions according to a certain rule and, otherwise if inter-cell group transmissions, determines priorities of the uplink transmissions according to another rule at operation 1085. Here, the rules are the above-described rules according to the various embodiments of the present disclosure.

After transmitting the serving cell add control message to the UE 1005, the MeNB 1010 performs a DRB relocation procedure with the SeNB 1015 and an S-GW 1020 at operation 1070. In the DRB relocation procedure, the MeNB 1010 transmits to the SeNB 1015 the DRB data to be processed by the SeNB 1015, releases the EPS bearers corresponding to the relocated DRBs among the EPS bearers established between the S-GW 1020 and the MeNB 1010, and reestablishes the EPS bearers between the S-GW 1020 and the SeNB 1015.

The UE 1005 may initiate the random access procedure in the SeNB 1015 before transmitting the serving cell add response message so as to start data transmission/reception as soon as possible. For example, if the random access is prepared in the SCell after the receipt of the serving cell add control message, the UE 1005 starts the random access procedure immediately. The serving cell add response message may be transmitted after the random access procedure is completed or in the middle of the random access procedure. At this time, the UE 1005 transmits the serving cell add response message when the uplink transmission resource of the MCG serving cell is available for transmitting the serving cell add response message to the MeNB 1010.

Another embodiment of the present disclosure proposes a UE procedure of determining the RNTI to be received through monitoring based on the cell groups.

The RNTI is the information indicating the UE to which the Downlink Control Information (DCI) transmitted on PDCCH is addressed and sub-classified as follows in Table 11. The details of the RNTIs comply with the 3GPP standard TS36.211, 36.212, 36.213, 36.321, and 36.331.

TABLE 11

| RNTI | Usage |
| --- | --- |
| P-RNTI | Paging and System Information change notification |
| SI-RNTI | Broadcast of System Information |
| M-RNTI | MCCH Information change notification |
| RA-RNTI | Random Access Response |
| Temporary C-RNTI | Contention Resolution (when no valid C-RNTI is available) |
| C-RNTI | Dynamically scheduled unicast transmission |
| Semi-Persistent Scheduling C-RNTI | Semi-Persistently scheduled unicast transmission (activation, reactivation and retransmission) |
| TPC-PUCCH-RNTI | Physical layer Uplink power control |
| TPC-PUSCH-RNTI | Physical layer Uplink power control |

In the case that the Dual Connectivity (inter-eNB carrier aggregation) is configured, the SeNB and MeNB may transmit to the UE the DCI and PDSCH using different RNTIs. The RNTI-related operations are summarized in Table 12.

TABLE 12

| | RNTI allocation range and allocator | RNTI-monitoring UE operation | RNTI acquisition method |
|---|---|---|---|
| C-RNTI | Allocated per cell group, up to 2 C-RNTIs per UE. MCG C-RNTI (C-RNTI$_{MCG}$) and SCG C-RNTI (C-RNTI$_{SCG}$) are determined by MeNB and SeNB respectively and may differ from each other. | UE monitors MCG serving cell PDCCH for C-RNTI$_{MCG}$ and SCG serving cell PDCCH for C-RNTI$_{SCG}$. | C-RNTI$_{MCG}$ is allocated through RRC Connection Reconfiguration message in the RRC connection establishment procedure or handover procedure, and C-RNTI$_{SCG}$ is allocated through a control message configured by pSCell. |
| SPS C-RNTI | Allocated for PCell and pSCell, up to 2 SPS C-RNTIs per UE. The SPS C-RNTI for PCell (SPS C-RNTI$_{PCell}$) and SPS C-RNTI for pSCell (SPS C-RNTI$_{PSCell}$) are determined by MeNB and SeNB respectively and may differ from each other. In the case that SPS is used in the PCell, the UE may be allocated one SPS C-RNTI. | If SPS is configured in MCG, the UE monitors the PCell PDCCH for SPS C-RNTI$_{PCell}$. If SPS is configured in SCG, the UE monitors the pSCell PDCCH for SPS C-RNTI$_{PSCell}$. If SPS is used in a PCell, and if SPS is configured, the UE monitors the PCell PDCCH for SPS C-RNTI. | SPS C-RNTI is allocated through the RRC connection reconfiguration message containing SPS configuration information (SPS-config). |
| TPC-PUCCH-RNTI | Allocated for PCell and pSCell, up to 2 TPC-PUCCH-RNTIs per UE. The TCP-PUCCH-RNTI for PCell (TPC-PUCCH-RNTI$_{PCell}$) and TCP-PUCCH-RNTI for pSCell (TPC-PUCCH-RNTI$_{PSCell}$) are determined by the MeNB and SeNB respectively and may differ from each other. | If the TPC-PUCCH-RNTI$_{PCell}$ is allocated, the UE monitors the PCell PDCCH for receiving TPC of a PCell PUCCH. If TPC-PUCCH-RNTI$_{PSCell}$ is allocated, the UE monitors the pSCell PDCCH for receiving TPC of a pSCell PUCCH. | TPC-PUCCH-RNTI$_{PCell}$ is allocated through RRC Connection Setup message or RRC Connection Reconfiguration message, and TPC-PUCCH-RNTI$_{PSCell}$ is allocated through RRC Connection Reconfiguration message including pSCell configuration information. |
| TPC-PUSCH-RNTI | Allocated for PCell and pSCell, up to 2 TPC-PUSCH-RNTIs. The TPC-PUSCH-RNTI for PCell (TPC-PUSCH-RNTI$_{PCell}$) and the TPC-PUSCH-RNTI for pSCell (TPC-PUSCH-RNTI$_{PSCell}$) are determined by the MeNB and SeNB respectively and may differ from each other. | If TPC-PUSCH-RNTI$_{PCell}$ is allocated, the UE monitors PCell PDCCH for receiving TCP of a PCell PUSCH. If TPC-PUCCH-RNTI$_{PSCell}$ is received, the UE monitors pSCell PDSCH for receiving TPC of a pSCell PUCCH. | TPC-PUSCH-RNTI$_{PCell}$ is allocated through RRC Connection Setup message or RRC Connection Reconfiguration message, and TPC-PUSCH-RNTI$_{PSCell}$ pSCell is allocated through the RRC Connection Reconfiguration message including pSCell configuration information. |
| P-RNTI | One common RNTI is used across two cell groups. | UE monitors PCell for P-RNTI. | A certain RNTI is used. |
| SI-RNTI | One common RNTI is used across two cell groups. | UE monitors PCell for SI-RNTI. | A certain RNTI is used. |
| RA-RNTI | A plurality of RNTIs are reserved per serving cell. | UE transmits a random access preamble in a serving cell and monitors the serving cell for RA-RNTI. If the preamble has been transmitted in an MCG serving cell, the serving cell is the PCell and, | A certain RNTI is used. |

TABLE 12-continued

| RNTI allocation range and allocator | RNTI-monitoring UE operation | RNTI acquisition method |
|---|---|---|
| M-RNTI One common RNTI is used across two cell groups. | otherwise if the preamble has been transmitted in an SCG serving cell, the serving cell is pSCell. The UE monitors the serving cell through which MBMS service is received or to be received for M-RNTI | A certain RNTI is used. |

According to various embodiments of the present disclosure, RNTIs are classified into various types as follows, and the UE performs distinct monitoring operations according to the type of RNTI.

First type RNTI: A UE may be allocated the first type RNTI per cell group and up 2 first type RNTIs. The UE monitors all the serving cells in the activated state for the first type RNTI. C-RNTI is included in the first type RNTI.

Second type RNTI: A UE may be allocated the second type RNTI per cell group, and up to 2 second type RNTIs. The UE monitors a serving cell for the second type RNTI. TPC-PUCCH-RNTI and TPC-PUSCH-RNTI are included in the second type RNTI. The serving cell is PCell or pSCell.

The third type RNTI: A UE is allocated up to 1 third type RNTI for a specific cell group. The UE monitors a serving cell of the corresponding cell group for the third type RNTI. SPS-RNTI is included in the third type RNTI. The specific cell group is the MCG, and the serving cell is PCell.

Fourth type RNTI: A UE is allocated up to 1 fourth RNTI for a specific cell group. The UE monitors a serving cell of the corresponding cell group for the fourth type RNTI. The SI-RNTI and P-RNTI are included in the fourth type RNTI. The specific cell group is MCG, and the serving cell is PCell. The third type RNTI and the fourth type RNTI are different in that the third type RNTI has a UE-specific unique value allocated through an RRC control message but the third type RNTI has a value common to all UEs.

Fifth type RNTI: The fifth type RNTI is allocated per serving cell independently of cell group, and a UE monitors the corresponding serving cell for the fifth type RNTI when a certain event (e.g., a random access preamble transmission) occurs. If the serving cell in which the event occurs is an MCG serving cell monitors the PCell and, otherwise if the serving cell in which the event occurs is a SCG serving cell, the pSCell for the fifth RNTI. RA-RNTI is included the fifth type RNTI.

Figure 14:
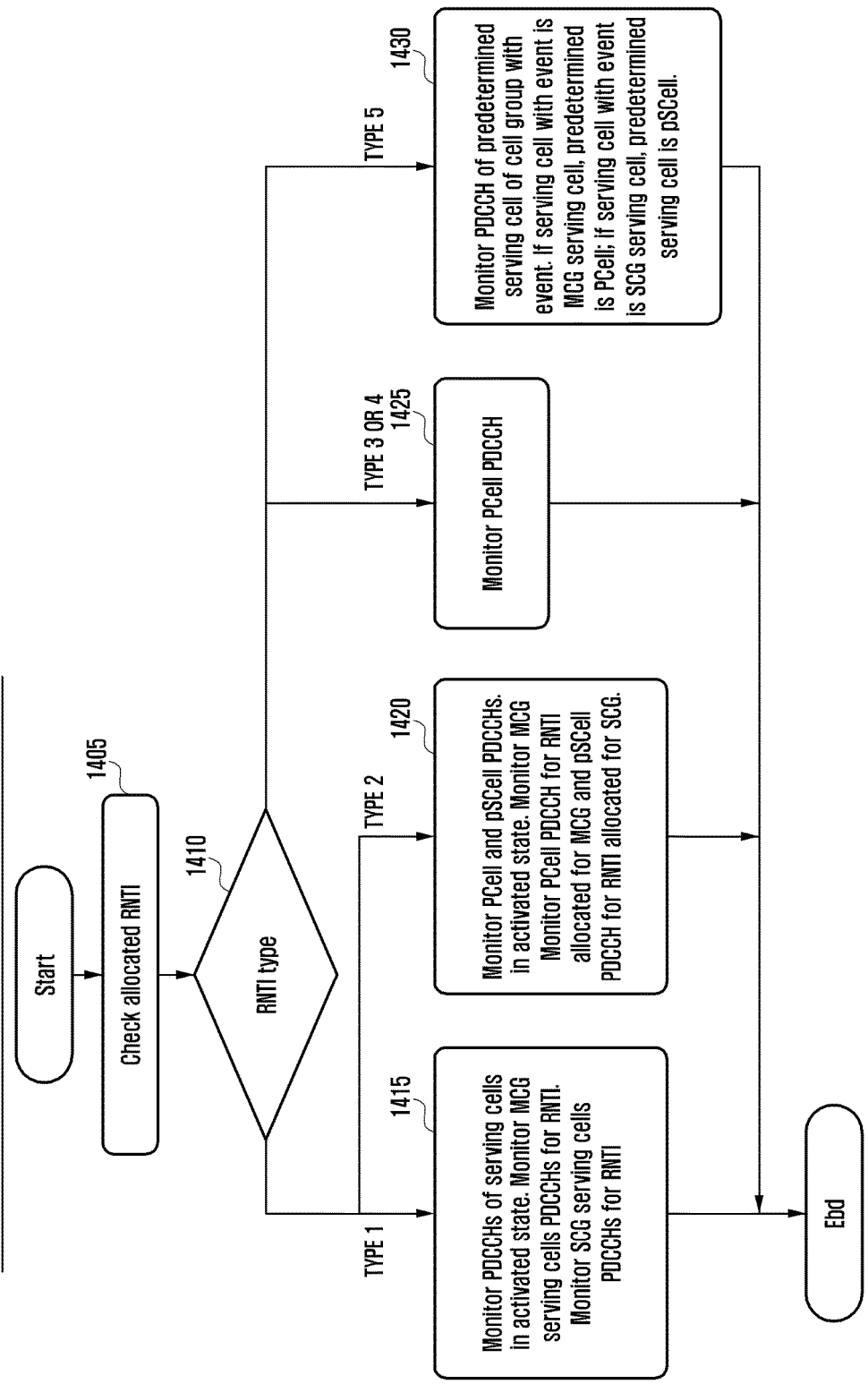
FIG. 14 is a flowchart illustrating a procedure of determining, at a UE, a serving cell to be monitored for receiving Radio Network Temporary Identity (RNTI) according to an embodiment of the present disclosure.

FIG. 14 is a flowchart illustrating a procedure of determining, at a UE, a serving cell to be monitored for receiving RNTI according to an embodiment of the present disclosure.

Referring to FIG. 14, the UE determines the allocated RNTI at operation 1405. The UE is allocated at least one first type RNTI and one fourth type RNTI and allocated the second type RNTI and the third type RNTI optionally.

The UE determines the type of RNTI for which it monitors PDCCH in a subframe to determine the serving cell to monitor its PDCCH at operation 1410. If the target RNTI is the first type RNTI, the procedure goes to operation 1415, if the target RNTI is the second type RNTI, the procedure goes to operation 1420, if the target RNTI is the third or fourth type RNTI, the procedure goes to operation 1425, and if the target RNTI is the fifth type RNTI, the procedure goes to operation 1430.

At operation 1415, the UE monitors PDCCHs of the serving cells in the activated state. More particularly, the UE monitors the MCG serving cells PDCCHs for the first type RNTI related to the MCG and the SCG serving cells PDCCHs for the first type RNTI related to the SCG.

At operation 1420, the UE monitors the PCell PDCCH for the second type RNTI related to MCG and pSCell PDCCH for the second type RNTI related to SCG.

At operation 1425, the UE monitors the PCell PDCCH for the third or fourth type RNTI.

At operation 1430, the UE monitors the PCell or pSCell PDCCH for the fifth type RNTI of the cell in which the event has occurred. If the cell in which the event has occurred is an MCG serving cell, the UE monitors the PCell PDCCH and, otherwise if the cell in which the event has occurred is an SCG serving cell, the pSCell PDCCH.

Figure 15:
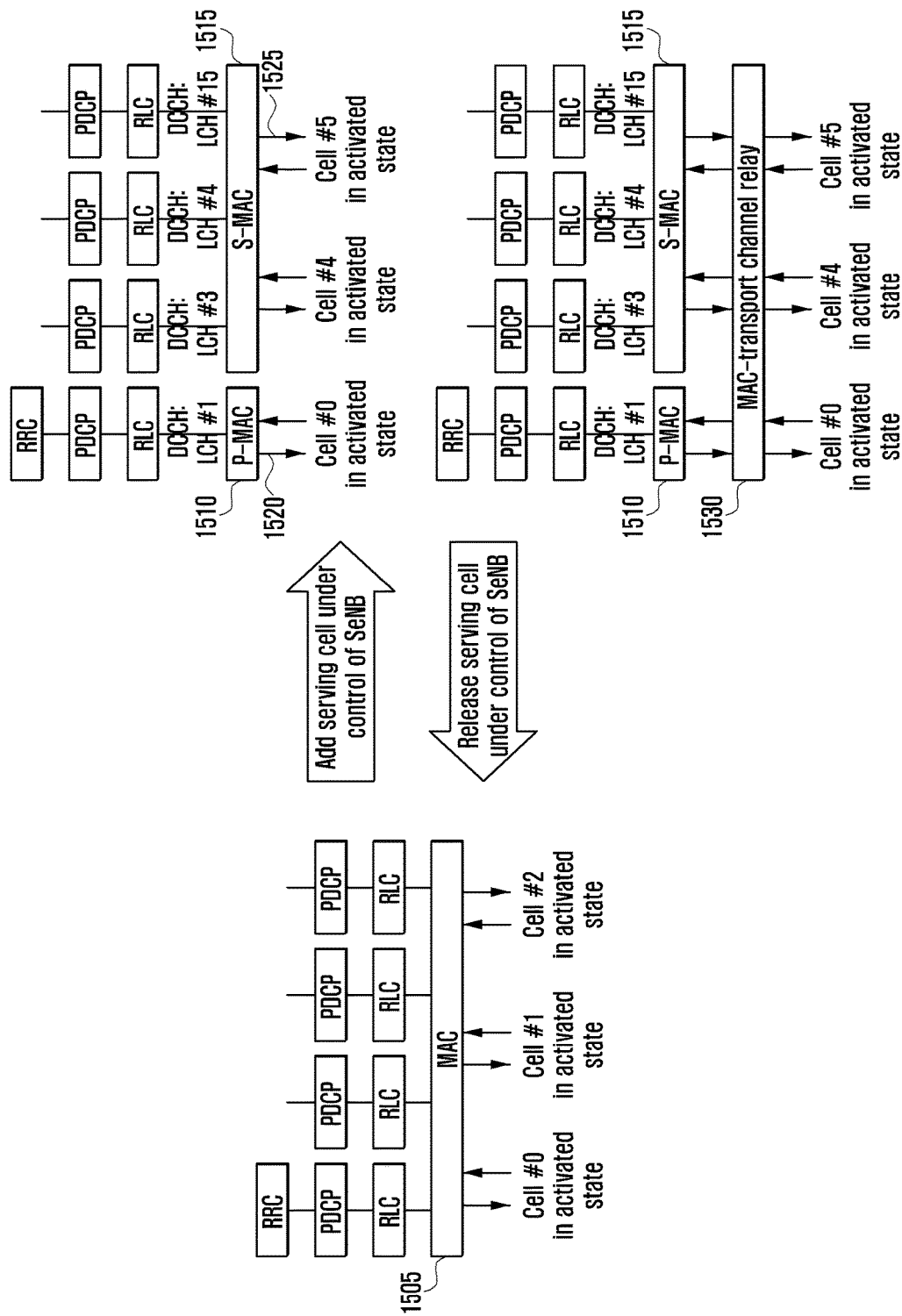
FIG. 15 is a diagram illustrating an operation mechanism of a UE with two Medium Access Control (MAC) entities according to an embodiment of the present disclosure.

FIG. 15 is a diagram illustrating an operation mechanism of a UE with two MAC entities 1505 according to an embodiment of the present disclosure.

Referring to FIG. 15, the UE is provided with two MAC entities 1505. In this case, one MAC entity is responsible for MCG serving cell-related operation and the other for SCG serving cell-related operation.

In the following description, MAC entities 1505 are classified into various types as follows for explanation convenience.

Normal MAC entity: MAC entity established when CA is not configured or, although CA is configured, when all the CA-available serving cells are controlled by one eNB (or when no SCG is configured).

Primary MAC (P-MAC) entity 1510: MAC entity connected to the serving cells controlled by the MeNB when at least one MAC entity is established in the UE (i.e., when at least one serving cell is configured to the UE and the at least one serving cell is controlled by one eNB).

Secondary MAC (S-MAC) entity 1515: MAC entity connected to the serving cells controlled by an SeNB when at least one MAC entity is established in the UE (i.e., when at least one serving cell is configured to the UE and the at least one serving cell is controlled by at least one eNB).

The normal MAC entity connects all the logical channels configured in the UE to the serving cells in the activated state among all serving cells configured to the UE.

The S-MAC entity connects certain logical channels among the logical channels configured in the UE to serving cells among all serving cells configured to the UE. The serving cells are the serving cells under the control of the SeNB and are indicated by an RRC control message explicitly. The logical channels are the logical channels indicated by the RRC control message explicitly.

The P-MAC entity 1510 connects other logical channels among the logical channels configured in the UE to other serving cells of all serving cells configured to the UE. The other serving cells are the serving cells under the control of the MeNB and not included the serving cells indicated explicitly by the RRC control message. A serving cell (e.g., PCell) is connected to the P-MAC entity 1510. The other logical channels are the logical channels except for the logical channels indicated explicitly by the RRC control message. A logical channel, e.g., DCCH, is connected to the P-MAC entity 1510.

If certain logical channels are connected to certain serving cells (or transport channels 1530 mapped to the serving cells), the data received through the serving cells are transferred to the logical channels and the data occurred on the logical channels are transmitted through the serving cells.

A serving cell may consist of downlink which is referred to as Downlink Shared Channel (DL-SCH) and uplink which is referred to as Uplink Shared Channel (UL-SCH). Accordingly, the uplink 1520 of the serving cell #0 may be referred to as UL-SCH of the serving cell #0, and the downlink 1520 of the serving cell #5 as DL-SCH of the serving cell #5.

According to various embodiments of the present disclosure, the MAC entity is responsible for connecting the logical channels and the transport channels 1530.

The MAC entity is also responsible for random access function, UL transmission timing maintenance function, Semi-Persistent Scheduling (SPS) function, Scheduling Request procedure (see TS36.321), Buffer Status Reporting procedure (see TS 36.321), Power Headroom Reporting procedure (see TS36.321), and HARQ buffer management function.

In an embodiment of the present disclosure, when an event related to the MAC reset occurs, the UE resets the P-MAC 1510 and S-MAC 1515 entities selectively according to the type of the event.

Figure 16:
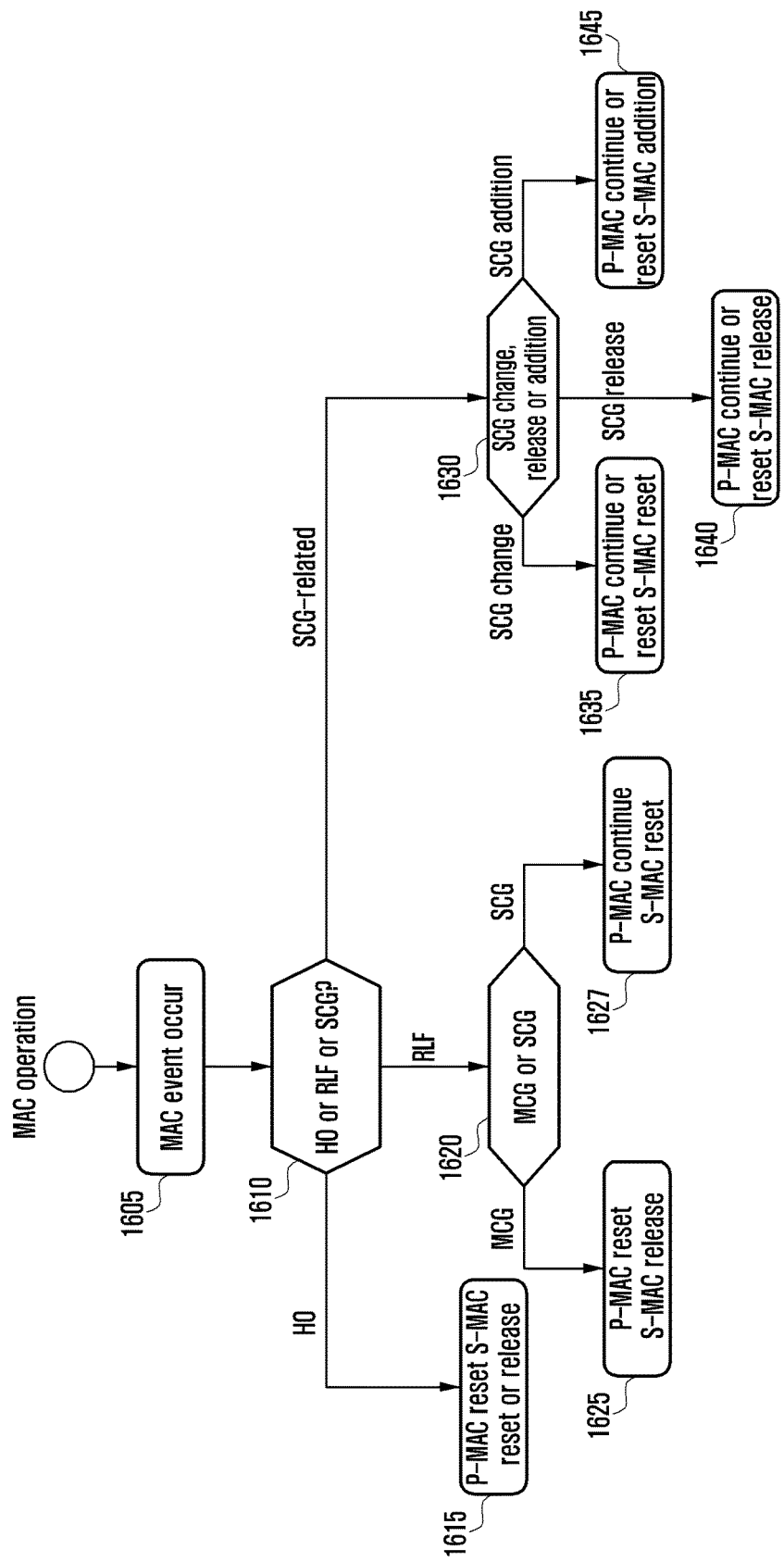
FIG. 16 is a flowchart illustrating a MAC procedure of a UE according to an embodiment of the present disclosure.

FIG. 16 is a flowchart illustrating a MAC procedure of a UE according to an embodiment of the present disclosure.

Referring to FIG. 16, a certain MAC event occurs in the UE at operation 1605. The MAC event is an event triggering MAC entity initialization, add, and release, e.g., handover and SCG add.

The UE determines whether the MAC event is a handover, or Radio Link Failure (RLF), or SCG-related event at operation 1610. If the MAC event is the handover event (i.e., if a handover command is received from the eNB), the procedure goes to operation 1615, if the MAC event is the RLF event, operation 1620, and if the MAC event is the SCG-related event, operation 1630.

At operation 1615, the UE resets or releases the P-MAC or S-MAC. If the handover command control message indicates SCG change, the UE resets the S-MAC and, otherwise if the handover command control message indicates SCG release, releases the S-MAC.

At operation 1620, the UE determines whether the RLF has occurred in MCG or SCG.

If the RLF occurs in the MCG, this indicates that a state in which the channel quality of a certain cell (e.g., a PCell) among the serving cells belonging to the MCG is below a certain threshold lasts over a certain duration.

If the RLF occurs in the SCG, this indicates that a state in which the channel quality of a certain cell (e.g., a pSCell) among the serving cells belonging to the SCG is below a certain threshold lasts over a certain duration.

Here, the channel quality may be the channel quality of PDCCH.

If the RLF occurs in the MCG, this indicates that the UE cannot maintain the current RRC connection any longer in the MCG and thus the UE performs the RRC Connection Reestablishment procedure. At this time, the UE resets the P-MAC entity and releases the S-MAC entity.

If the RLF occurs in the SCG, this indicates that the UE cannot maintain the current RRC connection any longer in the SCG. In this case, however, it is possible to maintain the normal communication through MCG. Accordingly, the UE maintains the current operation of the P-MAC entity and resets the S-MAC entity.

The reason for releasing the S-MAC while resetting the S-MAC at operation 1625 is because it is likely to resume the multi-connection operation soon and it is necessary to stop uplink transmission through MAC reset without release of the S-MAC entity for maintaining uplink transmission through SCG in the case that the procedure goes to operation 1627 while there is no need the S-MAC entity due to the multi-connection operation impossibility before finding a new PCell in the case that the procedure goes to operation 1625.

At operation 1630, the UE determines whether the SCG-related event is an SCG change event, an SCG release event, or an SCG add event.

If the event is the SCG change event, i.e., if the control message received from the eNB instructs to release the current SCG or add a new SCG, the UE maintains or resets the P-MAC entity and resets the S-MAC entity at operation 1630. If the control message instructs handover too, the UE resets the P-MAC entity and, otherwise, maintains the P-MAC entity. If the SCG is changed, this indicates that it is necessary to stop the MAC operation in the current SCG and starts the MAC operation newly in a new SCG and thus the UE resets the S-MAC at operation 1635.

If the event is the SCG release event, i.e., if the control message received from the eNB instructs to release the current SCG without any new SCG add command, the UE maintains or resets the P-MAC entity and release the S-MAC entity at operation 1640. If the control message instructs handover too, the UE resets the P-MAC entity and, otherwise, maintains the P-MAC entity. If the SCG is released, this indicates that it is necessary to stop the S-MAC entity and flush the HARQ buffer and then deactivates the software and hardware related to the S-MAC entity.

If the event is the SCG add event, i.e., if the control message received from the eNB instructs to add a new SCG, the UE maintains or resets the P-MAC entity and adds a new S-MAC entity at operation 1645. If the control message instructs handover too, the UE resets the P-MAC entity and, otherwise, maintains the P-MAC entity. Addition of the S-MAC entity means indicates it is necessary to activate the software and hardware related to the S-MAC entity.

According to various embodiments of the present disclosure, it is also possible establishing a new S-MAC entity after releasing the S-MAC entity instead of resetting the S-MAC entity.

The S-MAC and P-MAC entities reset operations are summarized in Table 13.

TABLE 13

| P-MAC entity reset | S-MAC entity reset |
|---|---|
| Stop/end TAG timeAlignmentTimers configured to MCG | Stop/end TAG timeAlignmentTimers configured to SCG |
| Set NDIs (variable related HARQ initial transmission/retransmission) of HARQ processes of MCG serving cells to all 0. | Set NDIs of HARQ processes of SCG serving cells (variable related HARQ initial transmission/retransmission) to all 0. |
| End ongoing random access procedures in a PCell and MCG serving cells | End ongoing random access procedures in a pSCell and SCG serving cells |
| Discard ra-PreambleIndex and ra-PRACH-maskIndex allocated in MCG | Discard ra-PreambleIndex and ra-PRACH-maskIndex allocated in SCG |
| Stop ongoing scheduling request procedure in a PCell | Stop ongoing scheduling request procedure in a pSCell |
| Stop ongoing buffer status reporting procedure at P-MAC entity | Stop ongoing buffer status reporting procedure at S-MAC entity |
| Stop ongoing power headroom reporting procedure at P-MAC entity | Stop ongoing power headroom reporting procedure at S-MAC entity |
| Flush soft buffers of HARQ processes of MCG serving cells | Flush soft buffers of HARQ processes of SCG serving cells |
| Discard temporary identifier (C-RNTI) allocated in random access procedure | Discard temporary identifier (C-RNTI) allocated in random access procedure |
|  | Discard identifier (C-RNTI) allocated for use in SCG |

In Table 13, TimeAlignmentTimers, NDI, ra-PreambleIndex, and ra-PRACH-MaskIndex comply with those specified in TS36.321.

The reason why the C-RNTI is maintained in resetting the P-MAC but discarded in resetting the S-MAC is because the current C-RNTI is used for resuming the P-MAC entity in the new cell when resetting the P-MAC entity while such operation is not required when resetting the S-MAC entity.

Figure 17:
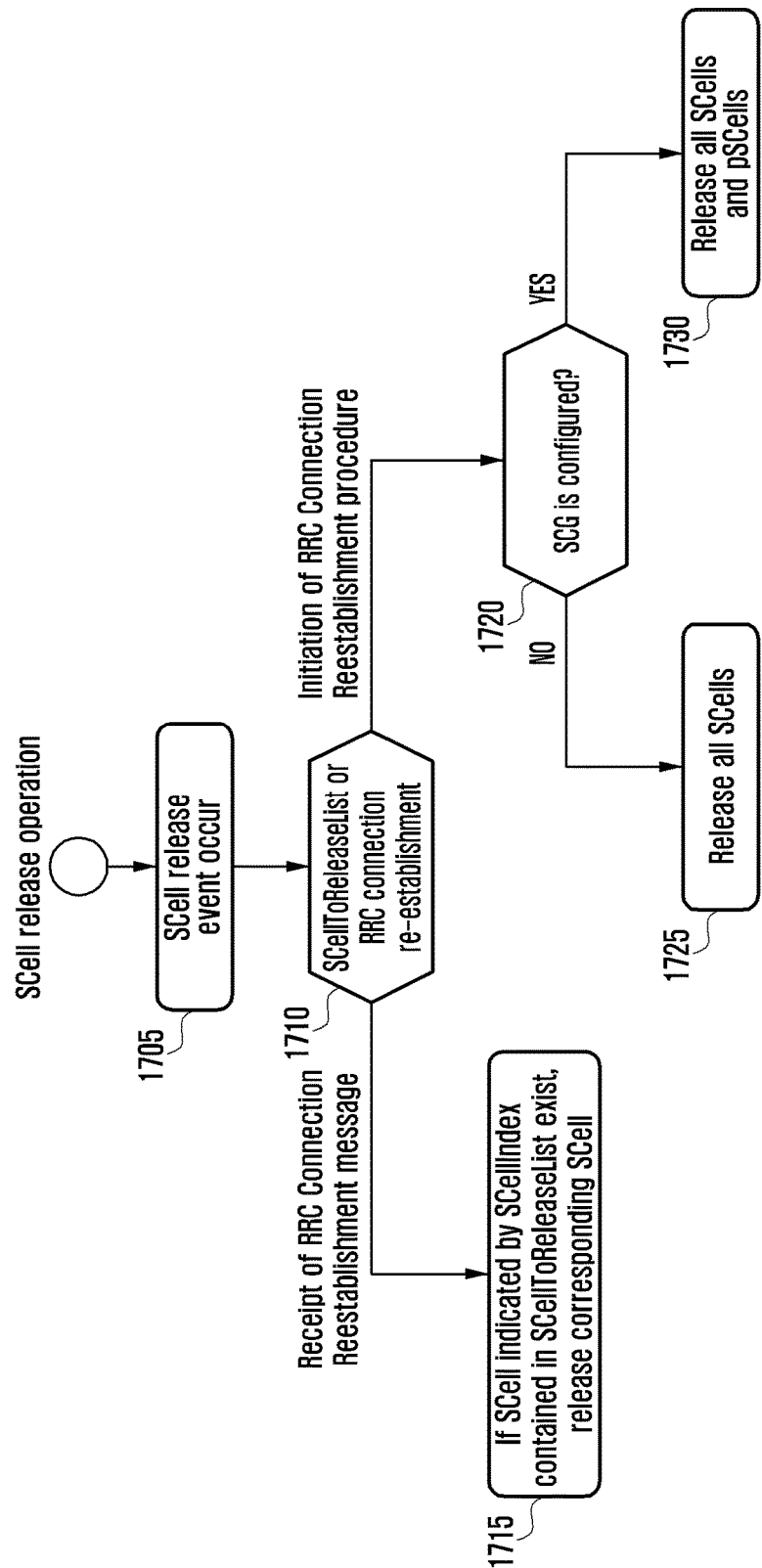
FIG. 17 is a flowchart illustrating a Secondary Serving cell (SCell) release procedure of a UE according to an embodiment of the present disclosure.

FIG. 17 is a flowchart illustrating an SCell release procedure of a UE according to an embodiment of the present disclosure.

Referring to FIG. 17, the SCell may be released according to the instruction of the eNB or the autonomous determination of the UE. If it is determined to release an SCell of a UE, the eNB transmits to the UE the RRC Connection Reestablishment message including SCellIndex information as the identifier of the cell to be released.

If the RRC connection procedure is triggered for the reason of RLF, the UE releases the configured SCells at the corresponding timing.

At operation 1705, an event requiring release of at least one SCell occurs to the UE. As described above, this event is of receiving an RRC control message fulfilling a certain condition or initiating the RRC connection reestablishment procedure. The RRC connection reestablishment procedure complies with that specified at section 5.3.7 of 3GPP TS36.331.

At operation 1710, the UE determines whether the event is of receiving the RRC Connection Reestablishment message including first information or initiating the RRC Connection Reestablishment procedure and, if the event is of receiving the RRC Connection Reestablishment message including the first information, the procedure goes to operation 1715 and, otherwise if the event is of initiating the RRC Connection Reestablishment procedure, the procedure goes to operation 1725.

The first information is SCellToReleaseList including the indices of the SCells to be released.

At operation 1715, the UE identifies the SCells having the same SCell indices as the CellToReleaseList among the SCells configured to the UE currently and releases the corresponding cells. If an SCell is released, this indicates that the transceiver is reset to stop receiving the PDSCH and transmitting PUSCH through the corresponding SCell.

The UE determines whether any SCG is configured (or DC is configured or two cell groups are configured) operation 1720 and, if no SCG is configured, releases all SCells configured at that time point at operation 1725 and ends the procedure.

If any SCG is configured, the UE releases the pSCell as well as all SCells configured at the time point at operation 1730. If the RRC Connection Reestablishment procedure is initiated, this indicates that an issue has occurred in the current RRC connection and thus it is preferred to stop uplink transmission immediately. Accordingly, it is preferred to release the pSCell too.

Figure 18:
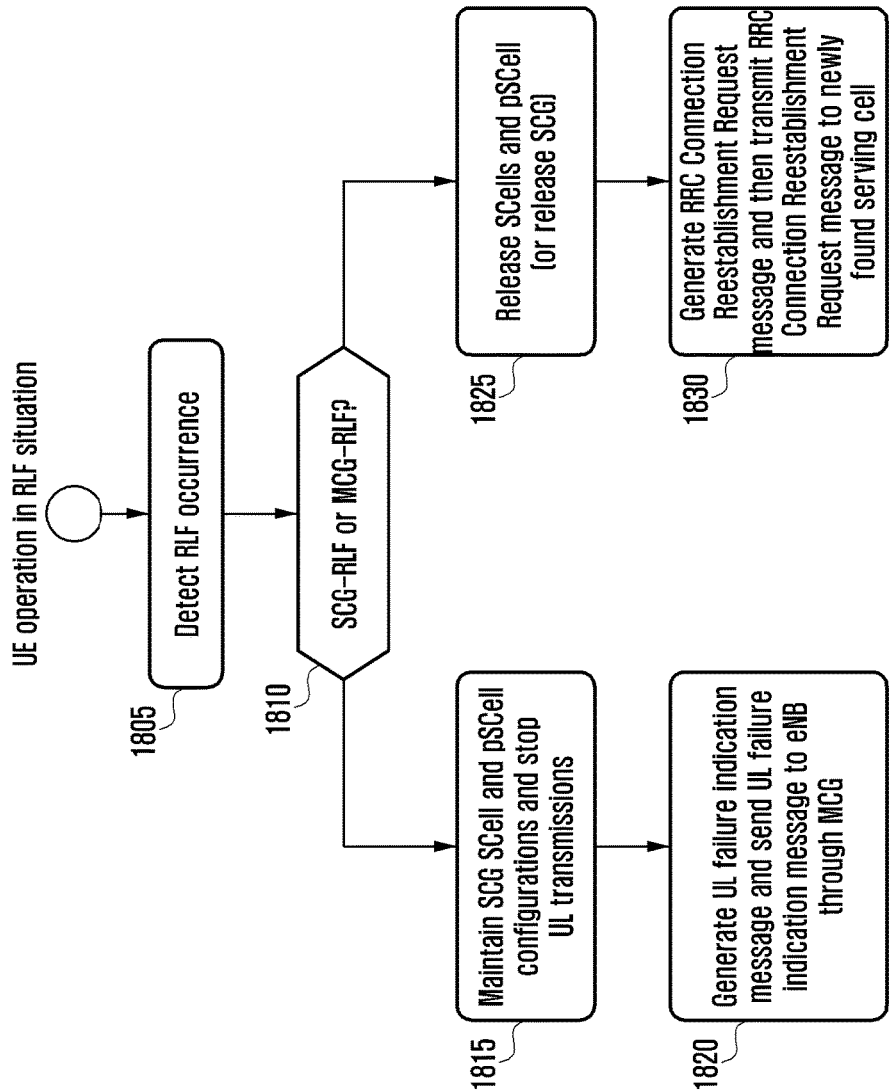
FIG. 18 is a flowchart illustrating an SCell management procedure of a UE in RLF situation according to an embodiment of the present disclosure.

FIG. 18 is a flowchart illustrating an SCell management procedure of a UE in an RLF situation according to an embodiment of the present disclosure.

Referring to FIG. 18, the UE detects RLF at operation 1805. For example, if T310 or T310s time expires, it is determined that RLF occurs.

The UE determines whether the RLF is SCG-RLF or MCG-RLF at operation 1810. The SCG-RLF occurs due to the issue in a SCG serving cell, particularly when a state in which the channel condition of the pSCell is below a certain threshold lasts over a certain duration. The MCG-RLF occurs due to the issue in a MCG serving cell, particularly when a state in which the channel condition of the PCell is below a certain threshold lasts over a certain duration.

If the RLF is the SCG-RLF, the procedure goes to operation 1815 and otherwise if the RLF is the MCG-RLF, operation 1825.

At operation 1815, the UE stops uplink transmission in the SCG serving cells, i.e., SCells and pSCell included in the SCG. At this time, the UE maintains the SCG serving cells and pSCell rather than releasing them. This is because the current configuration may be referenced in SCG serving reconfiguration afterward.

The UE generates a control message called 'UE failure indication' and transmits to the eNB the UE failure indication message through the MCG serving cells at operation 1820 and ends the procedure. This control message may include SCG-RLF reporting information and measurement information about the neighboring cells of the SCG serving cell frequency.

At operation 1825, the UE releases the SCG serving cells, i.e., SCells and pSCell included in the SCG. This is because if the MCG-RLF the UE is likely to reestablish the RRC connection with a new eNB and thus it is unlikely to reuse the current SCell and pSCell configuration.

The UE initiates the cell reselection procedure (see TS 36.304) to find the cell suitable for RRC connection reestablishment. If a new cell is selected, the UE transmits to the newly selected serving cell an RRC Connection Reestablishment Request message at operation 1830.

An embodiment of the present disclosure proposes an in-device interference resolution procedure of the UE.

In the case that multiple communication technologies (e.g., a cellular network technology (LTE/UMTS), a Wireless Local Area Network (WLAN), Bluetooth, and a GNSS/GPS) coexist in an UE, one communication technology-based transmission may interfere to another communication technology-based reception and, this is called in-device interference.

In order to mitigate the in-device interference, when the in-device interference occurs, the UE reports the in-device interference to the eNB, and the eNB takes a measure for canceling the in-device interference based on the report from the UE, e.g., handover of the UE to another frequency.

An embodiment of the present disclosure proposes a method for addressing the issue of reception failure of the location signal, such as a Global Navigation Satellite System (GNSS) signal, due to the in-device interference.

If in-device interference occurs, the UE determines whether the in-device interference is that the LTE signal transmission interferes the GNSS signal reception or that the LTE signal reception is interfered by other communication technology signal transmission and transmits to the eNB an in-device interference report control message which includes an indicator of the LTE uplink frequency interfering the GNSS signal reception for the former case or an indicator of the LTE downlink frequency interfered by other communication technology signal transmission for the latter case. At this time, the downlink frequency is indicated explicitly while the uplink frequency is analogized based on the relationship with the downlink frequency. The downlink frequency also may be indicated explicitly using a measurement target identifier while the uplink frequency is indicated using EARFCN.

Figure 19:
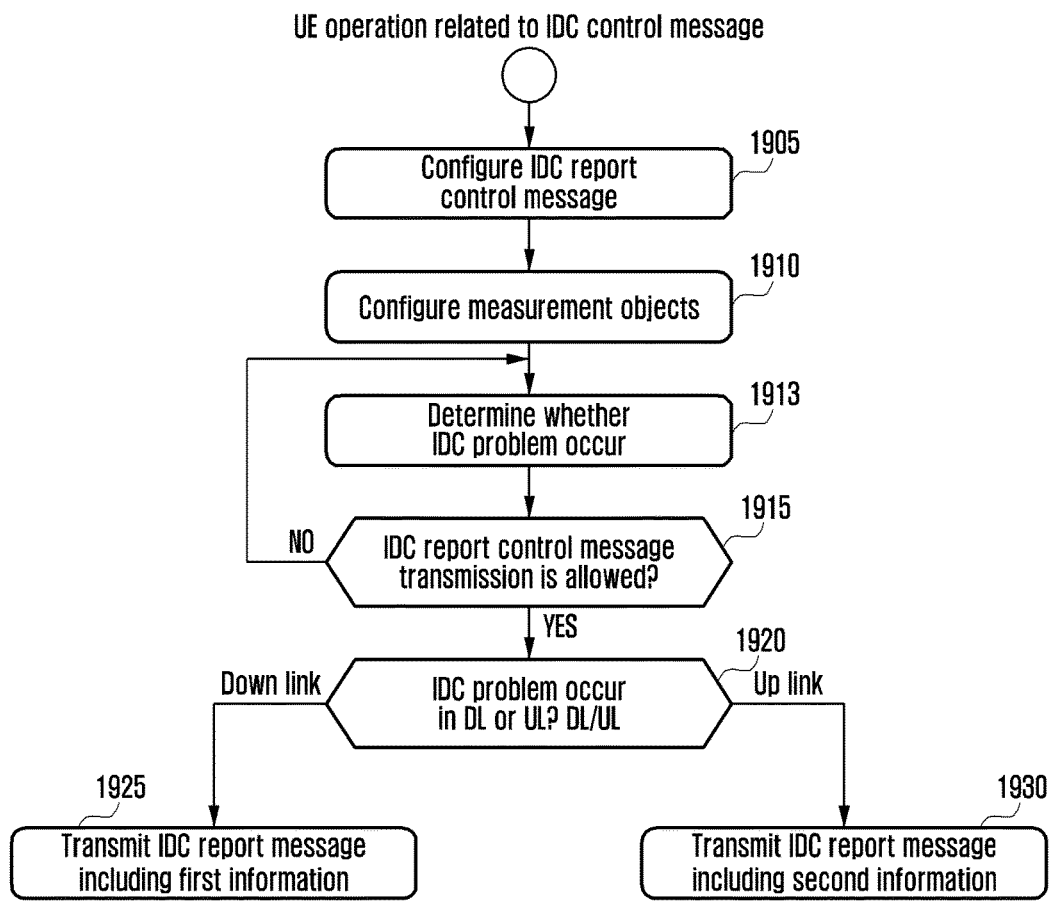
FIG. 19 is a signal flow diagram illustrating an in-device interference control procedure of a UE according to an embodiment of the present disclosure.

FIG. 19 is a signal flow diagram illustrating an in-device interference control procedure of a UE according to an embodiment of the present disclosure.

Referring to FIG. 19, the UE receives a control message (e.g., an RRC Connection Reconfiguration message) for configuring of transmitting (or not) the In-Device Coexistence Indication control message from the eNB at operation 1905. The In-Device Coexistence Indication control message is the control message for reporting occurrence of in-device interference, and the eNB configures the In-Device Coexistence Indication message transmission to part of UEs in the RRC Connection Reconfiguration procedure to prevent the control message from occurring too much or too frequently. The eNB may notify the UE of the In-Device Coexistence Indication message transmission availability using 1-bit information included in the RRC Connection Reconfiguration message.

The UE receives a control message for configuring measurement object from the eNB at operation 1910. The control message may be the RRC Connection Reconfiguration message. The measurement object is LTE/E-UTRA frequency to be measured by the UE, and the eNB configures an appropriate measurement object based on the UE capability, cell load status, UE mobility status, and the like. It is also possible to configure multiple measurement objects to the UE. The eNB informs the UE of a measurement object frequency identifier (16-bit E-UTRA Absolute Radio Frequency Channel Number (EARFCN) (see TS 36.101) and a 5-bit Measurement Object Identifier (ID).

Operations 1905 and 1910 may be performed with the same control message or different control messages. Operations 1905 and 1910 may be changed in order.

The UE determines whether any in-device coexistence issue occurs at operation 1913 and, if so, the procedure goes to operation 1915. At this time, the UE determines the downlink and uplink frequencies fulfilling certain conditions to determine whether the in-device coexistence issue.

At operation 1915, the UE determines whether the in-device coexistence report message transmission is allowed. If the in-device coexistence report message transmission is allowed, the procedure goes to operation 1920 and, otherwise, waits until the in-device coexistence report message transmission is allowed by going back to operation 1913. If the current state corresponds one of the following situations, the UE determines that the in-device coexistence report message transmission is allowed.

- In-device coexistence issue occurs on at least one LTE frequency or is ongoing, and no in-device coexistence report control message is transmitted yet since the in-device coexistence report control message transmission has been configured.
- In-device coexistence (hereinafter, referred to as IDC) problem occurs on at least one LTE frequency or is ongoing, and the frequency on which the IDC issue has occurred is changed although the IDC report control message has been transmitted.

The UE determines whether the IDC issue has occurred on a downlink frequency or uplink frequency at operation 1920 and, if the IDC issue has occurred on the downlink frequency, the procedure goes to operation 1925 and, otherwise if the IDC issue has occurred on the uplink frequency, operation 1930.

At operation 1925, the UE transmits to the eNB an IDC report control message including the first information indicating the downlink on which the IDC issue has occurred.

At operation 1930, the UE the eNB the IDC report control message including the second information indicating the uplink on which the IDC issue has occurred.

If the IDC issue occurs on the downlink frequency, this indicates that at least one of the LTE downlink frequencies configured as the measurement objects is affected by the in-device interference. Such an IDC issue may be exemplified by a situation in which the received signal quality on the downlink frequency is degraded to the extent below a certain threshold by the in-device interference and this state lasts over a certain duration.

If the IDC issue occurs on the uplink frequency, this indicates that the uplink transmission performed on one or more LTE uplink frequencies gives a bad effect to the receipt of an essential signal for location measurement, such as a GNSS, a GPS signal, and the like. Such an IDC issue may be exemplified by a situation in which the UE fails receiving the essential signal for location measurement over a certain time period.

In the current standard, a plurality of LTE frequencies is defined. If the UE has to determine all of the LTE frequencies to determine whether the IDC issue occurs, this is very burdensome to the UE.

In an embodiment of the present disclosure, the UE monitors the following LTE frequencies for determining IDC issue occurrence.

DL frequencies configured as measurement objects, and UL frequencies of current serving cell of UE.

The serving cells of the UE include a PCell which is configured with uplink and SCell(s) which is configured with uplink or not. Accordingly, the UE monitors the uplink of the PCell and uplinks of the S Cells that are configured with uplink for detecting IDC issue.

The first information indicating the downlink frequency on which the IDC issue has occurred is the identifier of the downlink frequency as the measurement object. For example, the UE transmits to the eNB a control message including the measurement object identifier indicating the downlink frequency on which IDC issue has occurred at operation 1925. At this time, the UE may transmit the information notifying that the IDC issue relates to LTE reception too. This information may notify whether the in-device interference affects the E-UTRA, other communication technology operation, or both of them. At operation 1925, the UE may transmit the information notifying the in-device interference affects the E-UTRA, i.e., the E-UTRA is the victim of the in-device interference.

The second information indicating the uplink frequency on which the IDC issue has occurred is the EARFCN indicating the uplink frequency or measurement object identifier configured to the downlink frequency related to the uplink frequency. If an uplink frequency is associated with a downlink frequency, this indicates that the downlink signal received through the downlink frequency has a relationship of controlling or influencing the uplink signal transmitted through the uplink frequency. For example, the uplink transmission resource for uplink transmission associated with the downlink may be allocated. In uplink transmission, the pathloss of the associated downlink may be considered in configuring the transmit power. In the case of the PCell, the relationship is notified through system information (System Information Block 2) and, in the case of the SCell, through an RRC control message (RRC Connection Reconfiguration message).

The UE transmits to the eNB the IDC report message including EARFCN indicating the uplink frequency on which the IDC issue has occurred explicitly or a measurement object identifier indicating the uplink frequency on which the IDC issue has occurred implicitly. The control message also may include the information notifying of the influence of the in-device interference to other communication technology operation, e.g., a GPS operation, other than E-UTRA.

Figure 11:
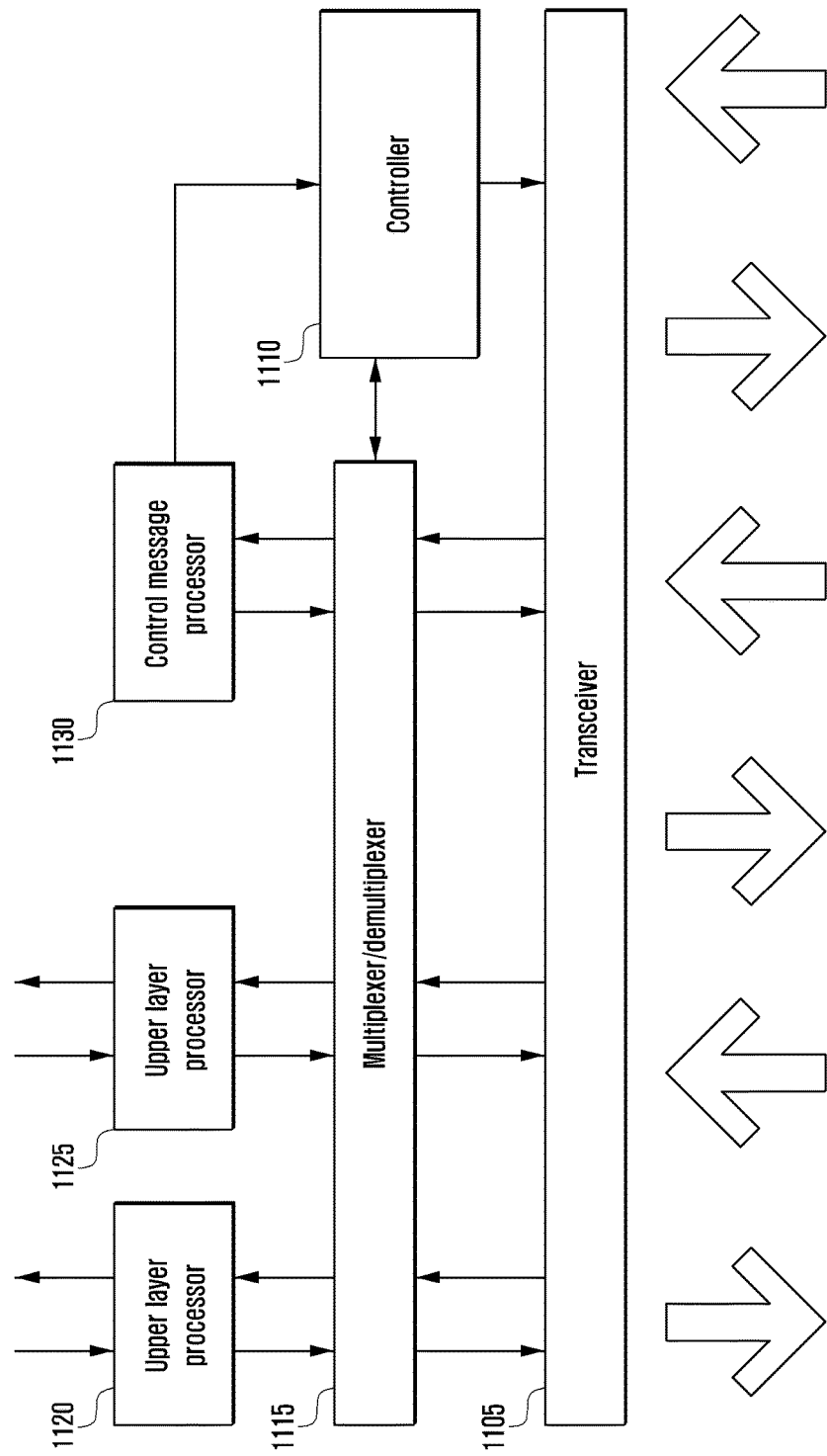
FIG. 11 is a block diagram illustrating a configuration of a UE according to an embodiment of the present disclosure.

FIG. 11 is a block diagram illustrating a configuration of a UE according to an embodiment of the present disclosure.

Referring to FIG. 11, the UE according to an embodiment of the present disclosure includes a transceiver 1105, a controller 1110, a multiplexer/demultiplexer 1115, a control message processor 1130, and upper layer processors 1120 and 1125.

The transceiver 1105 is responsible for receiving data and a control signal through a downlink channel of the serving cell and transmitting data and control signals through an uplink channel. In the case that a plurality of serving cells is configured, the transceiver 1105 transmits and receives data and control signals through the plural serving cells. The transceiver 1105 may include an RF Circuit/Front End of which operation frequency is configured under the control of the controller 1110.

The multiplexer/demultiplexer 1115 is responsible for multiplexing data generated by the upper layer processors 1120 and 1125 and the control message processor 1130 or demultiplexing data received by the transceiver 1105 to deliver the demultiplexed data to the upper layer processors 1120 and 1125 and the control message processor 1435.

The control message processor 1130 is an RRC layer entity for processing the control message received from the eNB to take action. For example, the control message processor 1130 receives RRC control message and transfers the SCell configuration information and transmit power control information to the controller 1110.

The upper layer processor 1120 and 1125 is established per service. The upper layer processors 1120 and 1125 process the data generated in the user service, such as File Transfer Protocol (FPT), Voice over Internet Protocol (VoIP), and the like, and transfers the processed data to the multiplexer/demultiplexer 1115 or processes the data from the multiplexer/demultiplexer 1115 and delivers the processed data to the upper layer service applications.

The control unit 1110 determines the scheduling command, e.g., uplink grants, received through the transceiver 1105 and controls the transceiver 1105 and the multiplexer/demultiplexer 1115 to perform uplink transmission with appropriate transmission resource at an appropriate timing. The controller 1110 also controls the SCell configuration procedure and the transmit power control procedure. For example, the control unit 1110 controls the UE operations described with reference to FIGS. 3 to 10. Although the controller 1110 and the transceiver 1105 are depicted as separated components in FIG. 11, part of the controller 1110 may be implemented in the transceiver 1105. More particularly, the transmit power adjustment may be controlled by a separate control mode included in the transceiver 1105.

Figure 12:
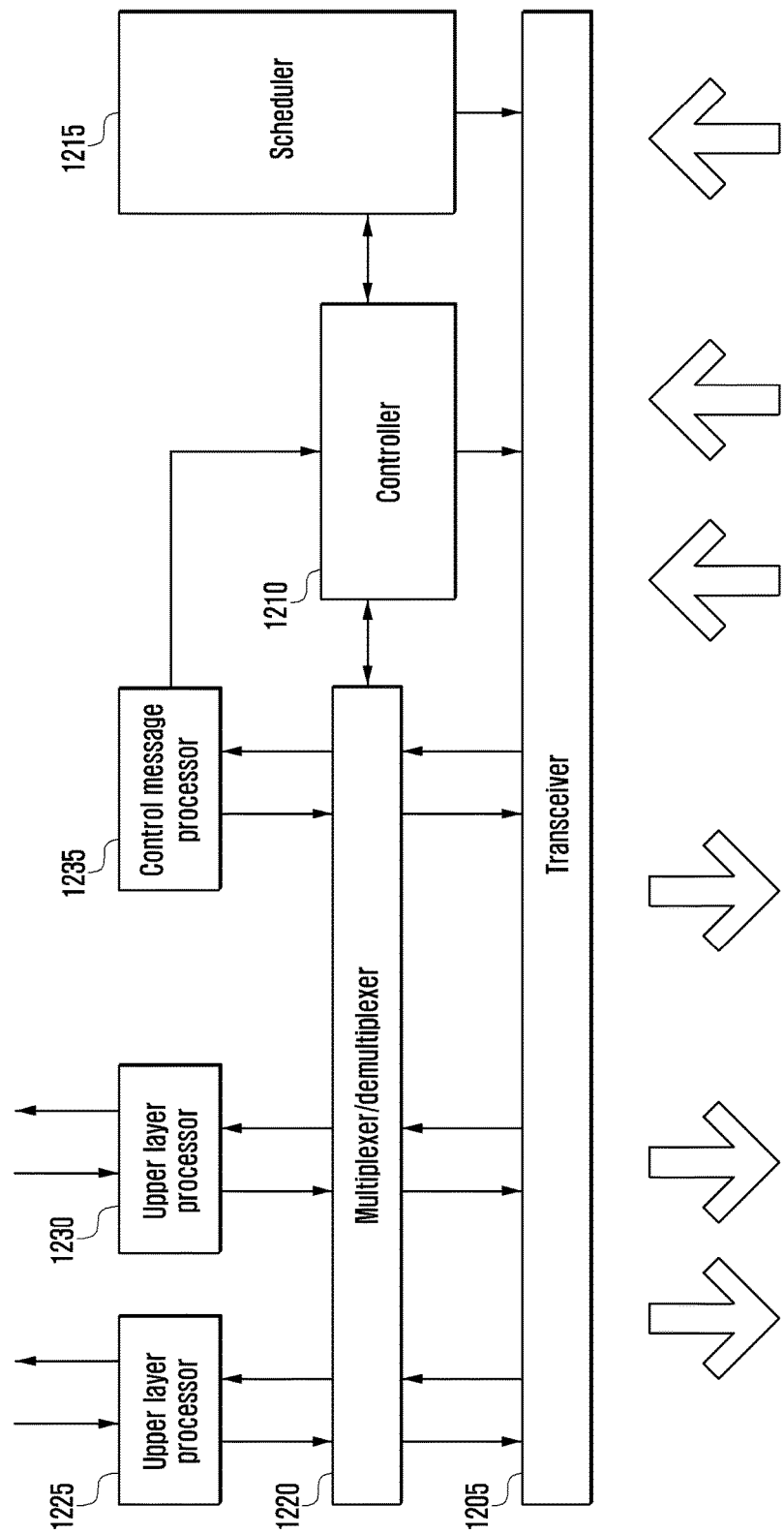
FIG. 12 is a block diagram illustrating a configuration of an eNB according to an embodiment of the present disclosure.

FIG. 12 is a block diagram illustrating a configuration of an eNB according to an embodiment of the present disclosure.

Referring to FIG. 12, the eNB includes a transceiver 1205, a controller 1210, a multiplexer/demultiplexer 1220, a control message processor 1235, upper layer processors 1225 and 1230, and a scheduler 1215.

The transceiver 1205 is responsible for transmitting data and a control signal through a downlink channel and receiving data and control signals through an uplink channel. In the case that a plurality of carriers is configured, the transceiver 1205 transmits and receives data and control signals through the plural carriers.

The multiplexer/demultiplexer 1220 is responsible for multiplexing data generated by the upper layer processors 1225 and 1230 and the control message processor 1235 or demultiplexing data received by the transceiver 1205 to deliver the demultiplexed data to the upper layer processors 1225 and 1230, the control message processor 1235, and the controller 1210. The control message processor 1235 processes the control message transmitted by the UE to take action or generates a control message addressed to the UE to the lower layer.

The upper layer processor 1225 (or 1230) is established per service, processes the data to be transmitted to the S-GW or another eNB into RLC PDU and transfers the RLC PDU to the multiplexer/demultiplexer 1220, and processes the RLC PDU from the multiplexer/demultiplexer 1220 into PDCP SDU to be transmitted to the S-GW or another eNB.

The scheduler 1215 allocates transmission resource to the UE at an appropriate timing based on the buffer state and channel condition of the UE and processes the signal transmitted form the UE or to be transmitted to the UE through the transceiver 1205.

The controller 1210 controls the SCell configuration procedure and the transit power adjustment procedure. The controller 1210 controls the eNB operations described with reference to FIGS. 3 to 10.

The following terms that are used in embodiments of the present disclosure comply with the definitions specified in 3GPP TS 36.211, 36.212, and 36.213.

PUCCH, CSI, CQI, PDSCH, PDSCH, HARQ feedback, Uplink grant, Downlink Assignment, and Uplink Control information (UCI).

As described above, the multicarrier-based data transmission method and apparatus of the present disclosure is advantageous in terms of increasing the data rate of the terminal through inter-eNB carrier aggregation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal, the method comprising:
receiving a first message including a first cell-radio network temporary identifier (C-RNTI) for a master cell group (MCG);
receiving a second message including a second C-RNTI for a secondary cell group (SCG);
monitoring at least one activated cell of the MCG based on the first C-RNTI for the MCG;
monitoring at least one activated cell of the SCG based on the second C-RNTI for the SCG;
receiving a third message including a first RNTI for a power control of a PUCCH for the MCG;
receiving a forth message including a second RNTI for a power control of a PUCCH for the SCG;
monitoring a primary cell (pcell) of the MCG based on the first RNTI for the power control of the PUCCH for the MCG; and
monitoring a primary secondary cell (pscell) of the SCG based on the second RNTI for the power control of the PUCCH for the SCG.

2. The method of claim 1, further comprising:
identifying at least one of a paging-RNTI (P-RNTI) and a system information-RNTI (SI-RNTI) for the terminal; and
monitoring a primary cell (pcell) of the MCG based on the at least one of the P-RNTI and the SI-RNTI.

3. The method of claim 1,
wherein the first message comprises a handover message and the second message comprises a message for configuring the SCG for a dual connectivity.

4. The method of claim 1,
wherein the third message comprises a radio resource control (RRC) connection reconfiguration message, and
wherein the forth message comprises a control message for configuring the pscell of the SCG.

5. A terminal in a wireless communication system, the terminal comprising:
a transceiver configured to transmit and receive a signal; and
a controller configured to control the transceiver to:
receive a first message including a first cell-radio network temporary identifier (C-RNTI) for a master cell group (MCG),
receive a second message including a second C-RNTI for a secondary cell group (SCG),
monitor at least one activated cell of the MCG based on the first C-RNTI for the MCG,
monitor at least one activated cell of the SCG based on the second C-RNTI for the SCG,
receive a third message including a first RNTI for a power control of a PUCCH for the MCG,
receive a forth message including a second RNTI for a power control of a PUCCH for the SCG,
monitor a primary cell (pcell) of the MCG based on the first RNTI for the power control of the PUCCH for the MCG, and
monitor a primary secondary cell (pscell) of the SCG based on the second RNTI for the power control of the PUCCH for the SCG.

6. The terminal of claim 5,
wherein the controller is further configured to identify at least one of a paging-RNTI (P-RNTI) and a system information-RNTI (SI-RNTI) for the terminal and monitor a primary cell (pcell) of the MCG based on the at least one of the P-RNTI and the SI-RNTI.

7. The terminal of claim 5, wherein the first message comprises a handover message and the second message comprises a message for configuring the SCG for a dual connectivity.

8. The terminal of claim 5,
wherein the third message comprises a radio resource control (RRC) connection reconfiguration message, and
wherein the forth message comprises a control message for configuring the pscell of the SCG.

9. A method by a base station, the method comprises:
transmitting a first message including a first cell-radio network temporary identifier (C-RNTI) for a master cell group (MCG);
transmitting a second message including a second C-RNTI for a secondary cell group (SCG);
transmitting, on at least one activated cell of the MCG, control information generated by using the first C-RNTI for the MCG;
transmitting, on at least one activated cell of the SCG, control information generated by using the second C-RNTI for the SCG;
transmitting a third message including a first RNTI for a power control of a PUCCH for the MCG;
transmitting a forth message including a second RNTI for a power control of a PUCCH for the SCG,
transmitting, on a primary cell (pcell) of the MCG, control information generated by using the first RNTI for the power control of the PUCCH for the MCG; and
transmitting, on a primary secondary cell (pscell) of the SCG, control information generated by using the second RNTI for the power control of the PUCCH for the SCG.

10. A base station, in a wireless communication system, the base station comprises:
a transceiver configured to transmit and receive a signal; and
a controller configured to control the transceiver to:
transmit a first message including a first cell-radio network temporary identifier (C-RNTI) for a master cell group (MCG), transmit a second message including a second C-RNTI for a secondary cell group (SCG),
transmit, on at least one activated cell of the MCG, control information generated by using the first C-RNTI for the MCG,
transmit, on at least one activated cell of the SCG, control information generated by using the second C-RNTI for the SCG,
transmit a third message including a first RNTI for a power control of a PUCCH for the MCG,
transmit a forth message including a second RNTI for a power control of a PUCCH for the SCG,
transmit, on a primary cell (pcell) of the MCG, control information generated by using the first RNTI for the power control of the PUCCH for the MCG, and
transmit, on a primary secondary cell (pscell) of the SCG, control information generated by using the second RNTI for the power control of the PUCCH for the SCG.

* * * * *